US012791095B2

(12) United States Patent
Hattori et al.

(10) Patent No.: US 12,791,095 B2
(45) Date of Patent: Nov. 10, 2026

(54) GEAR STEP ESTIMATION METHOD, GEAR STEP ESTIMATION DEVICE, AND NON-TRANSITORY COMPUTER-READABLE STORAGE MEDIUM

(71) Applicant: HONDA MOTOR CO., LTD., Tokyo (JP)

(72) Inventors: Makoto Hattori, Saitama (JP); Masayuki Sunamoto, Saitama (JP); Naoki Nomura, Saitama (JP); Hirotaka Onuki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/992,983

(22) PCT Filed: Jul. 10, 2023

(86) PCT No.: PCT/JP2023/025460
§ 371 (c)(1),
(2) Date: Jan. 10, 2025

(87) PCT Pub. No.: WO2024/014431
PCT Pub. Date: Jan. 18, 2024

(65) Prior Publication Data

US 2026/0022764 A1 Jan. 22, 2026

(30) Foreign Application Priority Data

Jul. 11, 2022 (JP) ................................ 2022-111449

(51) Int. Cl.
*F16H 61/02* (2006.01)
*B62M 6/40* (2010.01)
*F16H 61/12* (2010.01)

(52) U.S. Cl.
CPC ........... *F16H 61/0213* (2013.01); *B62M 6/40* (2013.01); *F16H 61/12* (2013.01); *F16H 2061/124* (2013.01)

(58) Field of Classification Search
CPC ................ F16H 61/0213; F16H 61/12; F16H 2061/124; B62M 6/40
See application file for complete search history.

(56) References Cited

U.S. PATENT DOCUMENTS 6,125,316 A * 9/2000 Sasaki .................... F16H 61/12 192/3.3
11,149,844 B2 * 10/2021 Matsumoto ............ F16H 61/12
(Continued)

FOREIGN PATENT DOCUMENTS

DE 20320872 U1 5/2005
DE 102019115312 B3 11/2020
(Continued)

OTHER PUBLICATIONS

Aug. 15, 2023, Translation of International Search Opinion issued for related PCT Application No. PCT/JP2023/025460.
(Continued)

*Primary Examiner* — Edwin A Young
(74) *Attorney, Agent, or Firm* — Paratus Law Group, PLLC

(57) ABSTRACT

A gear step estimation method is of estimating a gear step of a transmission device of an electric assist bicycle including a motor and the transmission device which is provided in a power transmission path between the motor and a rear wheel and is capable of switching the gear step among n gear steps. The gear step estimation method includes a step of acquiring, at a first time, a gear ratio that is a gear ratio of a transmission section that is the entire or partial power transmission path including the transmission device, a step of comparing the acquired gear ratio with n preset gear ratios
(Continued)

set within a range of possible gear ratios taken by the n gear steps, and a step of estimating the gear step of the transmission device as an m-step in a case where the detected gear ratio matches an m-th preset gear ratios.

20 Claims, 10 Drawing Sheets

(56) References Cited

U.S. PATENT DOCUMENTS

| | | | |
|---|---|---|---|
| 2018/0170483 | A1 | 6/2018 | Niki |
| 2022/0089251 | A1 | 3/2022 | Nomura et al. |

FOREIGN PATENT DOCUMENTS

| | | | |
|---|---|---|---|
| JP | H07-002164 | A | 1/1995 |
| JP | 2002-240772 | A | 8/2002 |
| JP | 2018-100061 | A | 6/2018 |
| JP | 2018-136002 | A | 8/2018 |
| WO | WO 2021/049646 | A1 | 3/2021 |

OTHER PUBLICATIONS

Aug. 15, 2023, Translation of International Search Report issued for related PCT Application No. PCT/JP2023/025460.

May 19, 2026, European Search Report issued for related EP Application No. 23839603.0.

* cited by examiner

GEAR STEP ESTIMATION METHOD, GEAR STEP ESTIMATION DEVICE, AND NON-TRANSITORY COMPUTER-READABLE STORAGE MEDIUM

CROSS-REFERENCE TO RELATED APPLICATIONS

This application is a National Stage Patent Application of PCT International Application No. PCT/JP2023/025460 filed on Jul. 10, 2023, and claims priority from Japanese Patent Application No. 2022-111449 filed on Jul. 11, 2022, the entire contents of which are all incorporated herein by reference.

TECHNICAL FIELD

The present disclosure relates to a gear step estimation method, a gear step estimation device, and a non-transitory computer-readable storage medium storing a gear step estimation program, for estimating a gear step of a switching transmission device in a vehicle.

BACKGROUND ART

There has been an electric assist bicycle that assists a stepping force of a crank pedal with power of a motor. There also has been an electric assist unit capable of being retrofitted to an existing bicycle frame. For example, Patent Literature 1 discloses an electric assist bicycle in which an electric assist unit, obtained by unitizing a motor and a crankshaft, is configured to be capable of being retrofitted to a bicycle frame.

CITATION LIST

Patent Literature

Patent Literature 1: WO2021/049646A1

SUMMARY OF INVENTION

Technical Problem

However, according to the electric assist bicycle of Patent Literature 1, in order for the user to confirm the selected gear step, it is necessary to actually and visually confirm the display of the gear and the position of a switching unit for the user to operate and switch the gear step, and it is required to improve the visibility thereof.

The present disclosure provides a gear step estimation method, a gear step estimation device, and a non-transitory computer-readable storage medium storing a gear step estimation program, that are capable of estimating at any time which gear step of a switching transmission device is selected by the user.

Solution to Problem

A first aspect of the present disclosure relates to a gear step estimation method of estimating a gear step of a switching transmission device in a vehicle including

- a power source, and
- the switching transmission device provided in a power transmission path between the power source and a wheel, and capable of switching the gear step among n gear steps (n is a natural number of 2 or more), the gear step estimation method including:

- a step of acquiring, at a first time, a first gear ratio that is a gear ratio of a transmission section including the switching transmission device, the transmission section being a whole or a part of the power transmission path;
- a step of comparing the acquired first gear ratio with n reference values set within a range of possible gear ratios taken by the n gear steps; and
- a step of estimating the gear step of the switching transmission device as an m-step (m is a natural number of 1 or more and n or less) in a case where the first gear ratio matches an m-th reference value from a smallest among the n reference values.

A second aspect of the present disclosure relates to a non-transitory computer-readable storage medium storing a gear step estimation program of estimating a gear step of a switching transmission device in a vehicle including

- a power source, and
- the switching transmission device provided in a power transmission path between the power source and a wheel, and capable of switching the gear step among n gear steps (n is a natural number of 2 or more),
- the gear step estimation program causing a processor to execute:
- a process of acquiring, at a first time, a first gear ratio that is a gear ratio of a transmission section including the switching transmission device, the transmission section being a whole or a part of the power transmission path;
- a process of comparing the acquired first gear ratio with n reference values set within a range of possible gear ratios taken by the n gear steps; and
- a process of estimating the gear step of the switching transmission device as an m-step (m is a natural number of 1 or more and n or less) in a case where the first gear ratio matches an m-th reference value from a smallest among the n reference values.

A third aspect of the present disclosure relates to a gear step estimation device that estimates a gear step of a switching transmission device in a vehicle including

- a power source, and
- the switching transmission device provided in a power transmission path between
- the power source and a wheel, and capable of switching the gear step among n gear steps (n is a natural number of 2 or more),
- the gear step estimation device including:
- an acquisition unit configured to acquire, at a first time, a first gear ratio that is a gear ratio of a transmission section including the switching transmission device, the transmission section being a whole or a part of the power transmission path; and
- an estimation unit configured to compare the acquired first gear ratio acquired by the acquisition unit with n reference values set within a range of possible gear ratios taken by the n gear steps, and
  - estimate the gear step of the switching transmission device as an m-step (m is a natural number of 1 or more and n or less) in a case where the first gear ratio matches an m-th reference value from a smallest among the n reference values.

Advantageous Effects of Invention

According to the above aspects of the present disclosure, it is possible to estimate at any time which gear step of the switching transmission device is selected by the user.

DESCRIPTION OF EMBODIMENTS

[Vehicle Structure]

Subsequently, an electric assist bicycle is exemplified as an embodiment of the vehicle of the present disclosure.

Figure 1:
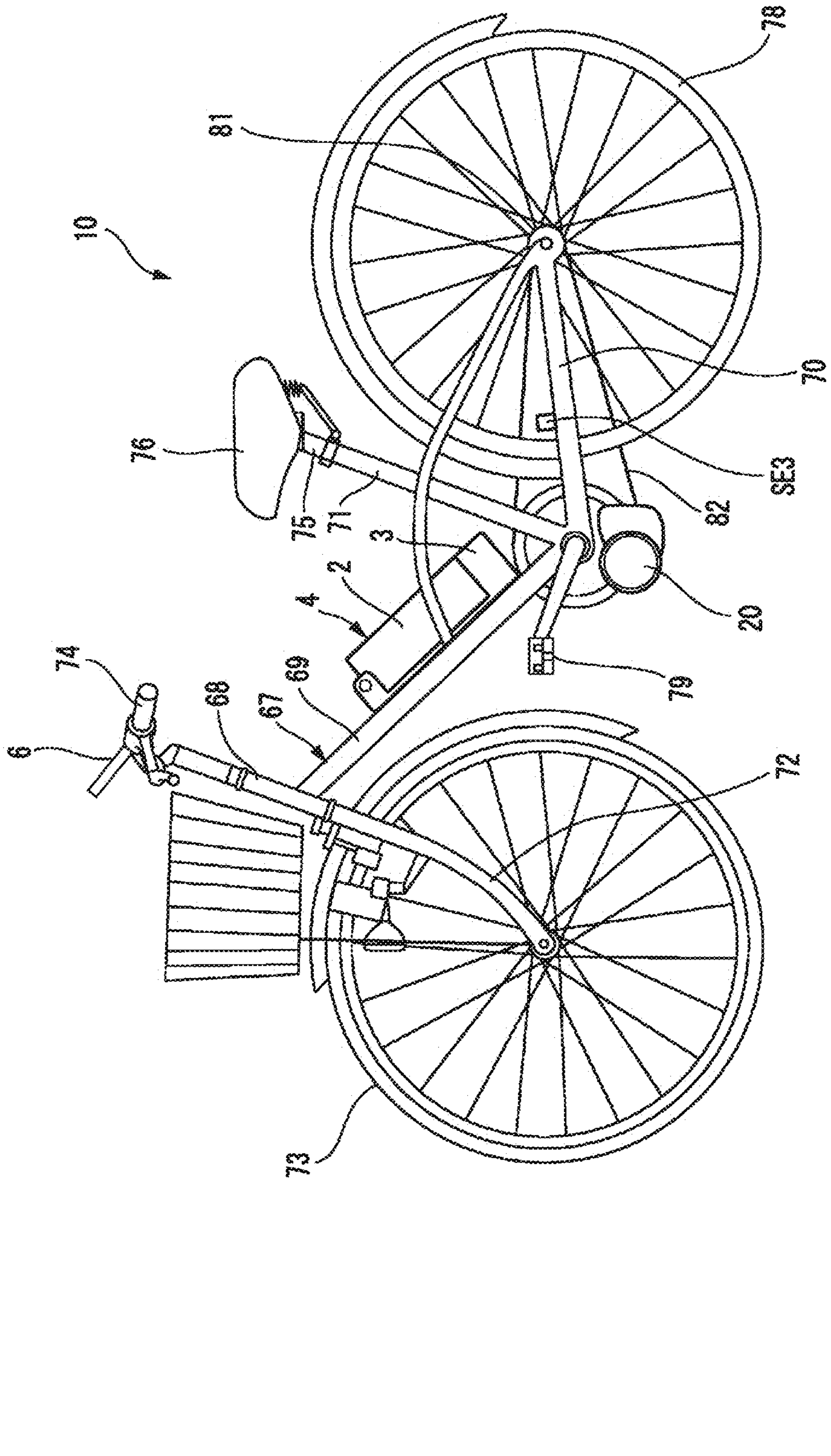
FIG. 1 is a side view of an electric assist bicycle 10 according to an embodiment of the present disclosure.
Figure 2:
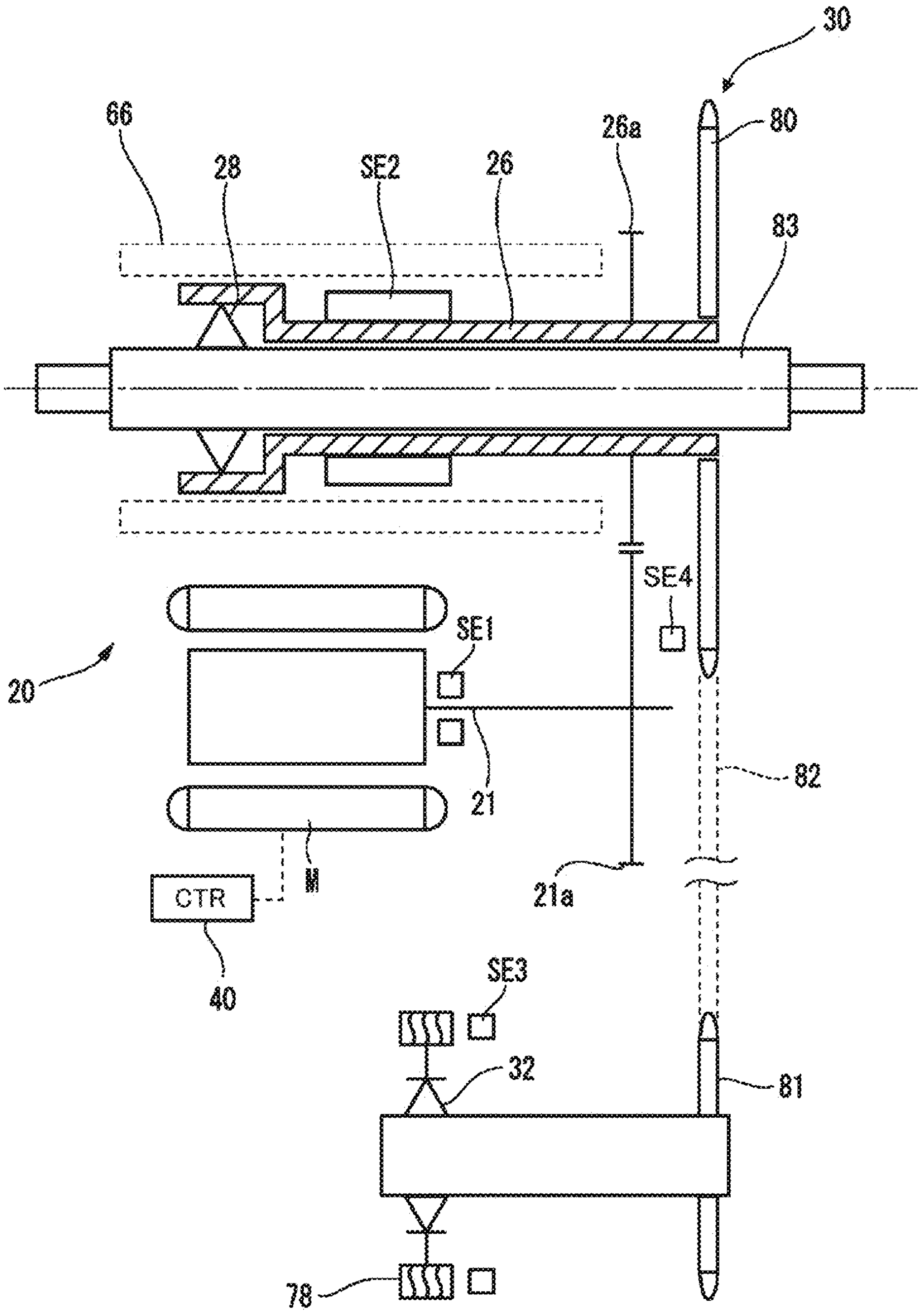
FIG. 2 is a schematic diagram illustrating a mechanism for transmitting power around a power unit 20, a crankshaft 83, and a rear wheel 78.

As illustrated in FIG. 1 and FIG. 2, an electric assist bicycle 10 is an electric assist bicycle including a front wheel 73, a rear wheel 78, a bicycle frame 67, a power unit 20 for driving the rear wheel 78, and a battery unit 4 electrically connected to the power unit 20. The electric assist bicycle is capable of outputting an assist force generated by the power unit 20.

The bicycle frame 67 includes a head pipe 68 at a front end, a down pipe 69 going down toward a rear side from the head pipe 68 and extending from a front portion to a rear portion of a vehicle body, a support pipe 66 (see FIG. 2) fixed to a rear end of the down pipe 69 and extending in a left-right direction, a seat post 71 rising upward from the support pipe 66, and a pair of left and right rear forks 70 extending rearward from the support pipe 66.

Front forks 72 are supported by the head pipe 68 so as to be steerable, and the front wheel 73 is pivotally supported by lower ends of the front forks 72. A steering handlebar 74 is provided at an upper end of the front forks 72. The steering handlebar 74 is provided with a portable terminal holder 6 for holding a portable terminal 8 (see FIG. 3) owned by a rider (for example, a driver). Note that the portable terminal holder 6 is not essentially necessary, and the portable terminal 8 may be attached to (stored by) the rider himself/herself or a wearing article (clothes, bag) of the rider. The rear wheel 78 as a drive wheel is pivotally supported between rear ends of the pair of left and right rear forks 70 extending rearward from the seat post 71. A support shaft 75 including a seat 76 at an upper end thereof is attached to the seat post 71 such that a position of the seat 76 in an up-down direction can be adjusted.

The battery unit 4 which supplies electric power to the power unit 20 is detachably fixed to the down pipe 69. More specifically, the battery unit 4 includes a base 3 attached to an upper surface of the down pipe 69, and a battery 2 detachably attached to the base 3 and having a plurality of cells therein.

Figure 3:
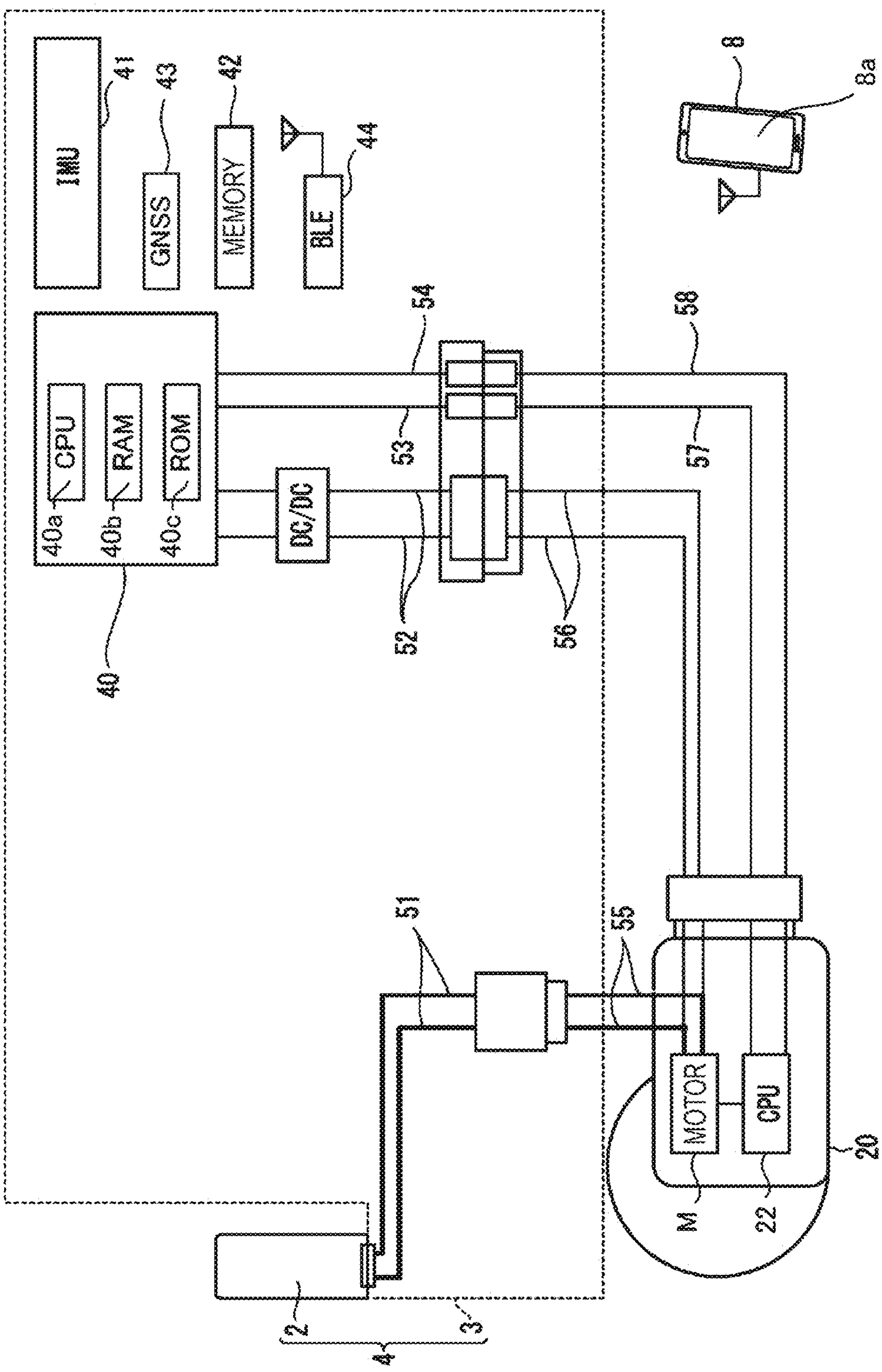
FIG. 3 is a diagram illustrating electric paths and communication paths of the power unit 20, a battery 2, and a control device 40 in the electric assist bicycle 10.

FIG. 3 is a diagram illustrating electric paths and communication paths of the power unit 20, the battery 2, and the control device 40 in the electric assist bicycle 10.

The control device 40 includes, for example, a central processing unit (CPU) 40*a* capable of executing various calculations, a random access memory (RAM) 40*b* used as a work area of the CPU 40*a*, and a storage medium such as a read only memory (ROM) 40*c* storing various kinds of information. The control device 40 calculates a torque (also simply referred to as power) to be generated by a motor M of the power unit 20 so that an assist force determined by a pedal stepping force described later and an assist ratio corresponding to a vehicle speed V [km/h] of the electric assist bicycle 10 is generated. Accordingly, the motor M operates in accordance with a CPU 22 of the power unit 20 which receives a calculation result (a drive request) from the control device 40. A converter DC/DC steps down the supplied DC voltage while keeping it as DC, thereby generating power supply voltages for the control device 40, an inertial measurement unit (IMU in the drawings) 41, a memory 42, a global navigation satellite system (GNSS) 43, and a Bluetooth Low Energy (registered trademark) (BLE) communication device 44.

The inertial measurement unit 41 is, for example, a 9-axis sensor having functions of a 3-axis acceleration sensor, a 3-axis angular velocity sensor, and a 3-axis azimuth sensor, and detects a mounting posture of the control device 40. The GNSS 43 acquires position information of the electric assist bicycle 10. The memory 42 is, for example, an SD card, and temporarily or permanently holds information, travel data, and the like of the electric assist bicycle 10. The BLE communication device 44 is a communication device for performing a BT connection (Bluetooth communication) with the portable terminal 8 or the like.

In an electric system and a communication system configured as described above, electric power from the battery 2 is supplied to the motor M of the power unit 20 via power lines 51 and 55, and electric power supplied from the power unit 20 via the power lines 56 and 52 and stepped down by the converter DC/DC is supplied to the control device 40, the inertial measurement unit 41, the GNSS 43, the memory 42, and the BLE communication device 44. Then, in a state where electric power is supplied to the control device 40, when an activation request for the power unit 20 is made via the portable terminal 8, a power-on signal is transmitted to the power unit 20 via signal lines 53 and 57, and the CPU 22 of the power unit 20 is activated. This enables the electric assist function capable of outputting the assist force generated by the power unit 20. When the power unit 20 is activated, information exchange is performed between the power unit 20 and the control device 40 via signal lines 54 and 58, and information exchange can be performed between the control device 40 and the portable terminal 8 and the like via the BLE communication device.

Returning to FIGS. 1 and 2, a pair of crank pedals 79 are coupled to a left end and a right end of a crankshaft 83 which coaxially penetrates the support pipe 66 of the bicycle frame 67. The stepping force (hereinafter referred to as a pedal stepping force) applied to the crank pedal 79 from the rider is transmitted to the crankshaft 83 and input to an endless chain 82 via a drive sprocket 80. The chain 82 is wound around the drive sprocket 80 and a driven sprocket 81 provided on an axle of the rear wheel 78.

In the power unit 20, an output shaft 21 of the motor M and the crankshaft 83 are disposed in parallel. The crankshaft 83 is rotatably supported on an inner side of a cylindrical sleeve 26 via a first one-way clutch 28. At an outer peripheral side of the sleeve 26, a driven gear 26*a* meshing with a motor output gear 21*a* provided on the output shaft 21 of the motor M and the drive sprocket 80 are fixed. Therefore, a torque of the motor M is transmitted to the drive sprocket 80 via the motor output gear 21*a*, the driven gear 26*a*, and the sleeve 26. That is, the motor M is provided in parallel with the crank pedal 79.

A second one-way clutch 32 is provided between the driven sprocket 81 and the rear wheel 78.

In the electric assist bicycle 10 configured as described above, when the crank pedal 79 is pedaled in an advancing direction (also referred to as a forward rotation direction or a forward direction), the first one-way clutch 28 is engaged, and forward rotation power of the crankshaft 83 is transmitted to the drive sprocket 80 via the sleeve 26 and is further transmitted to the driven sprocket 81 via the chain 82. At this time, since the second one-way clutch 32 is also engaged, the forward rotation power transmitted to the driven sprocket 81 is transmitted to the rear wheel 78.

On the other hand, when the crank pedal 79 is pedaled in a reversing direction (also referred to as a reverse rotation direction or a reverse direction), the first one-way clutch 28 is not engaged, reverse rotation power of the crankshaft 83 is not transmitted to the sleeve 26, and the crankshaft 83 idles.

Further, for example, when the forward rotation power in the advancing direction (the forward rotation direction) is input from the rear wheel 78 as in the case where the electric assist bicycle 10 is pushed in the advancing direction, the second one-way clutch 32 is not engaged and the forward rotation power of the rear wheel 78 is not transmitted to the driven sprocket 81. Therefore, the rear wheel 78 rotates relative to the driven sprocket 81. On the other hand, when the reverse rotation power in the reversing direction (the reverse rotation direction) is input from the rear wheel 78 as in the case where the electric assist bicycle 10 is pushed in the reversing direction, the second one-way clutch 32 is engaged, and the reverse rotation power of the rear wheel 78 is transmitted to the driven sprocket 81, and is further transmitted to the drive sprocket 80 via the chain 82. At this time, since the first one-way clutch 28 is also engaged, the reverse rotation power transmitted to the drive sprocket 80 is transmitted to the crankshaft 83 and the crank pedal 79, and the crankshaft 83 and the crank pedal 79 are reversely rotated.

The power unit 20 is provided with a motor rotation speed sensor SE1 which detects a rotation speed of the motor M. The motor rotation speed sensor SE1 includes a magnet and a Hall IC provided at an outer peripheral portion of the output shaft 21 of the motor M.

The sleeve 26 is provided with a torque sensor SE2 which detects a pedal torque value Tq generated by the pedal stepping force. The torque sensor SE2 is a magnetic displacement torque sensor disposed on an outer peripheral portion of the sleeve 26.

The control device 40 which controls the power unit 20 calculates the pedal stepping force based on the pedal torque value Tq which is an output value of the torque sensor SE2, and performs pulse width modulation (PWM) control over the motor M so that an assist force determined by the pedal stepping force and an assist ratio corresponding to the travel distance per unit time (hereinafter also referred to as a vehicle speed) of the electric assist bicycle 10 is generated.

The rear fork 70 is provided with a rear wheel rotation speed sensor SE3. The rear wheel rotation speed sensor SE3 is, for example, a magnetic detection sensor, and detects a magnetic pulse when a magnet attached to a spoke of the rear wheel 78 passes through the sensor. The rear wheel rotation speed sensor SE3 transmits the detected magnetic pulse as a vehicle speed pulse to the control device 40, and the control device 40 calculates the vehicle speed based on a pulse interval thereof. In general, only one magnet is attached to the rear wheel 78, and thus the magnetic pulse is detected once per one rotation of the rear wheel 78. Therefore, assuming that the vehicle speed is V [km/h] and a circumferential length of the rear wheel 78 is Ct [m], the vehicle speed V [km/h] is expressed by the following equation (1).

$$V[\text{km}/h] = \{Ct[\text{m}]/\text{magnetic pulse interval } (s)\} \times 3600/1000 \tag{1}$$

A cadence sensor SE4 is attached to a periphery of the drive sprocket 80. Since the drive sprocket 80 rotates integrally with the crank pedal 79 when the first one-way clutch 28 is engaged, the rotation of the drive sprocket 80 can be regarded as the rotation of the crank pedal 79. The cadence sensor SE4 is, for example, a magnetic detection sensor. The drive sprocket 80 is provided with eight magnets evenly spaced in a circumferential direction, and the cadence sensor SE4 detects a magnetic pulse when each of the magnets pass through the sensor. The cadence sensor SE4 transmits the detected magnetic pulse as a cadence pulse (cadence related information) to the control device 40 to be described later, and the control device 40 calculates cadence indicating a speed of the rotation (motion) of the crank pedal 79 based on a pulse interval thereof. The cadence pulse is detected eight times per one rotation of the crank pedal 79. Therefore, cadence C [rpm] is expressed by the following equation (2).

$$C[rpm] = \{1/(8 \times \text{magnetic pulse interval } (s)\} \times 60 \tag{2}$$

[Switching Transmission Device]

The electric assist bicycle 10 is provided with, in a power transmission path between the power unit 20 including the motor M and the rear wheel 78, a switching transmission device 30 capable of switching a gear step among eight gear steps. In the present embodiment, the switching transmission device 30 has eight front gears, each having a different number of teeth, provided on the drive sprocket 80. One front gear is selected among the eight front gears by a user operation. The gear ratio of the electric assist bicycle 10 is determined according to (number of teeth of selected front gear)/(number of teeth of driven sprocket 81).

[Regulation on Assist Ratio]

According to the regulations of Japan, an upper limit value of an assist ratio is 2 until a vehicle speed reaches [10 km/h], and the assist ratio needs to be gradually decreased from 2 to 0 when the vehicle speed changes from [10 km/h] to 24 [km/h]. Therefore, when the electric assist function is on, the control device 40 needs to set the assist ratio so as not to exceed the regulation in Japan.

[Gear Step Estimation Process]

Next, the gear step estimation process of estimating the gear step applied in the switching transmission device 30 in the electric assist bicycle 10 will be described with reference to FIGS. 4 to 8. The gear step estimation process is performed in the control device 40 by causing the CPU 40*a* to execute a gear step estimation program stored in the storage medium ROM 40*c*. The gear step estimation program may be provided by a communication unit, or provided by being stored in a storage medium such as a CD-ROM, or provided as a gear step estimation device by being stored in a dedicated terminal.

Figure 4:
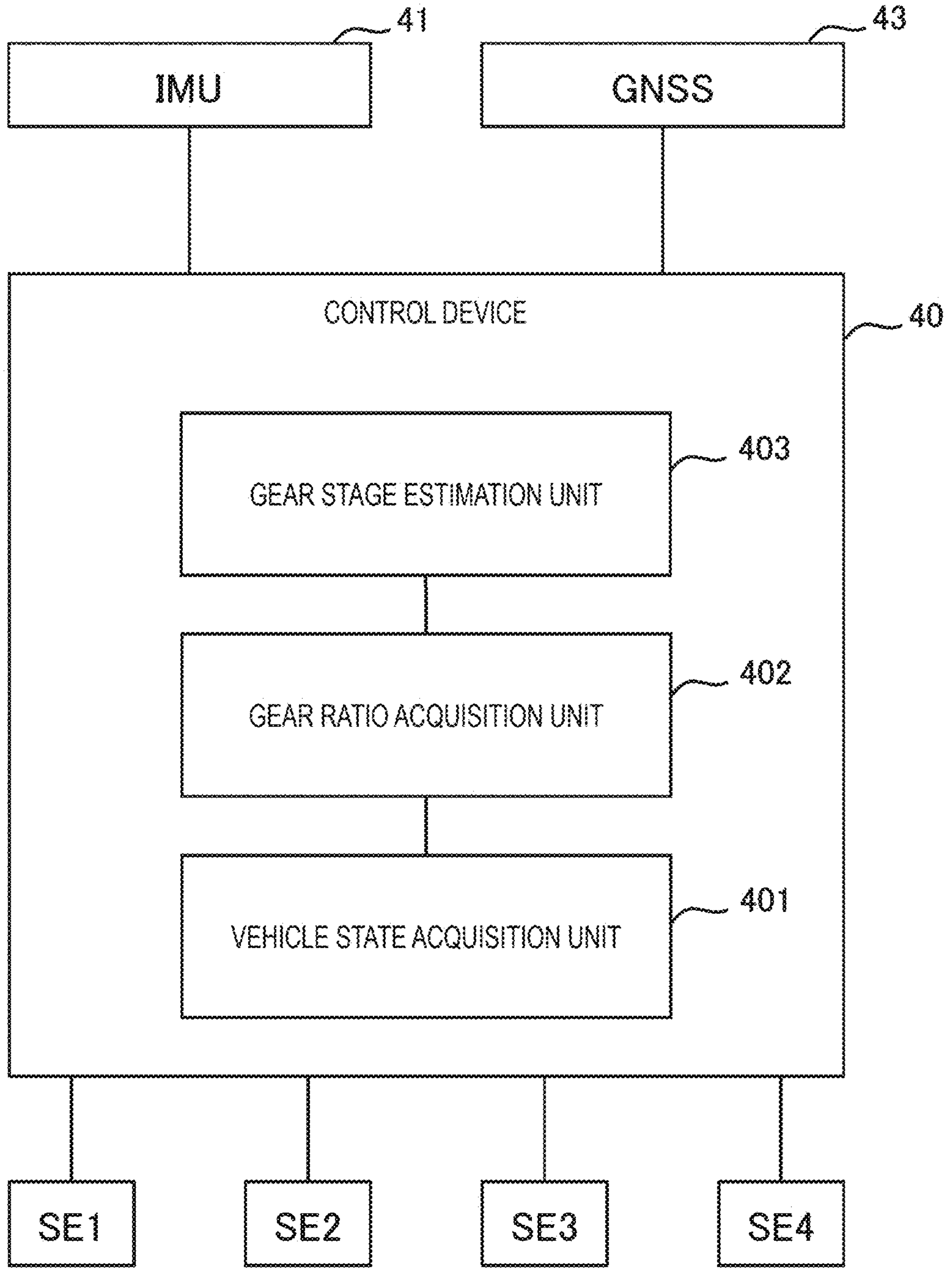
FIG. 4 is a block diagram of the control device 40 in the electric assist bicycle 10.
Figure 5:
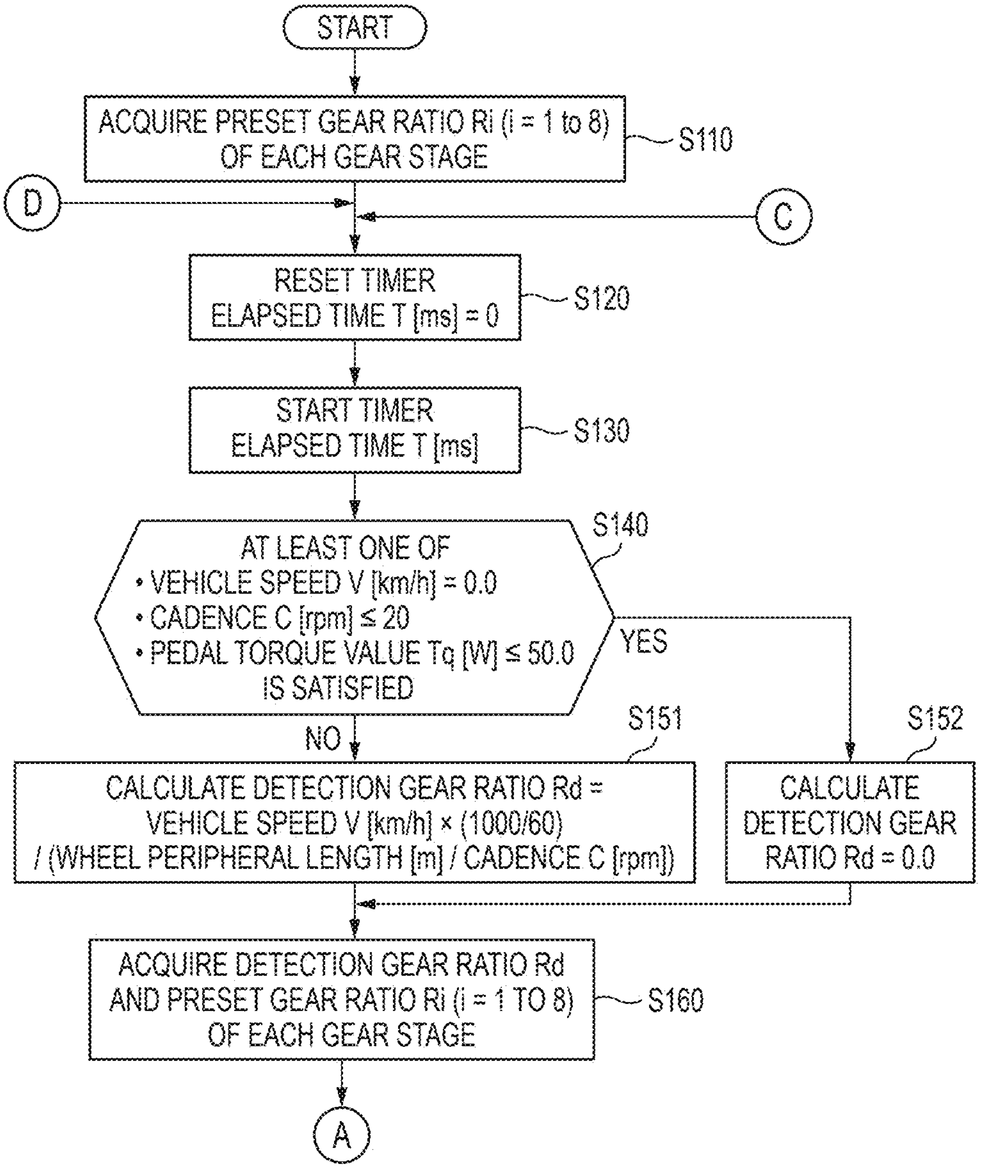
FIG. 5 is a flowchart (part 1) of the gear step estimation process in the electric assist bicycle 10.
Figure 6:
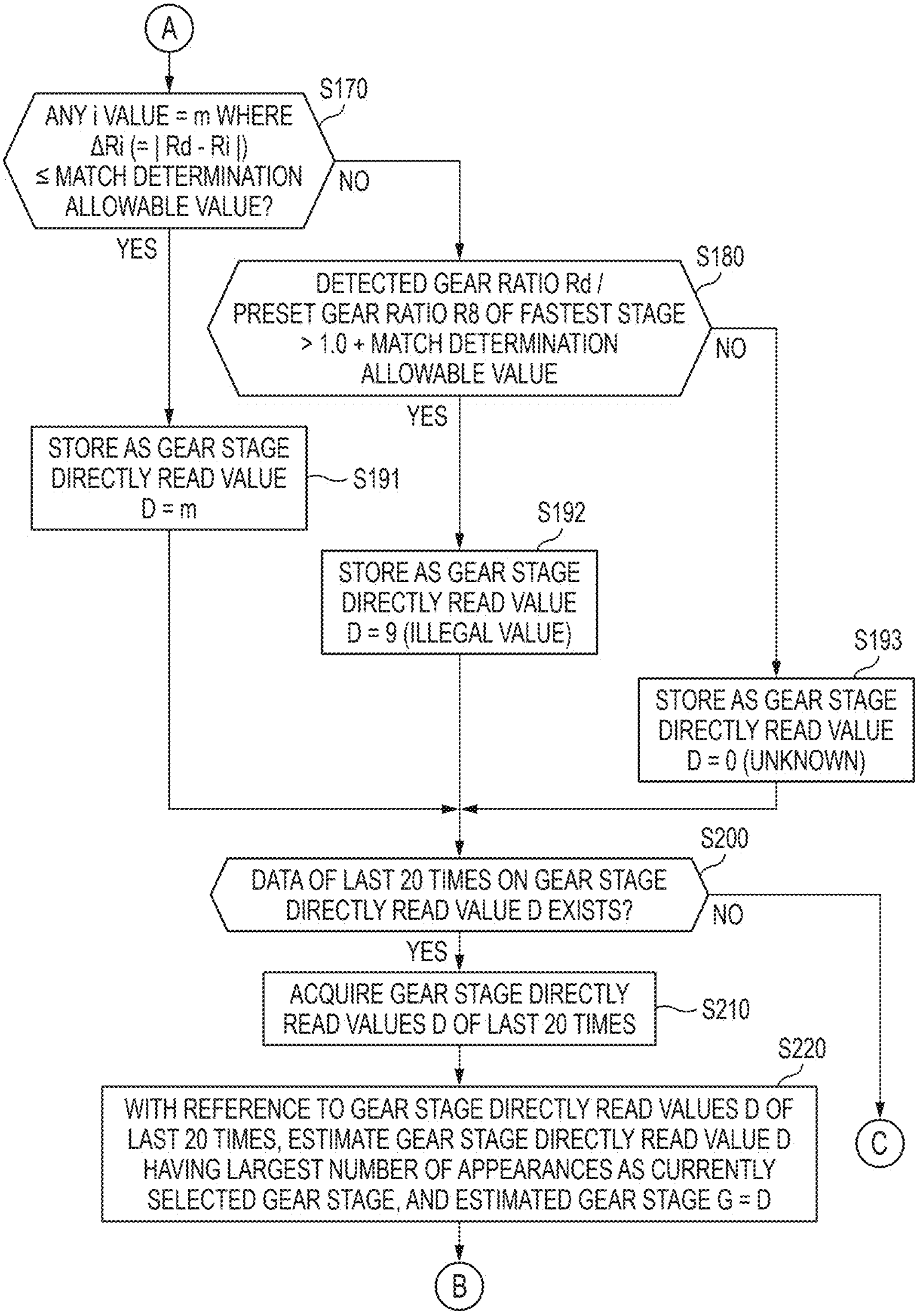
FIG. 6 is a flowchart (part 2) of the gear step estimation process in the electric assist bicycle 10.
Figure 7:
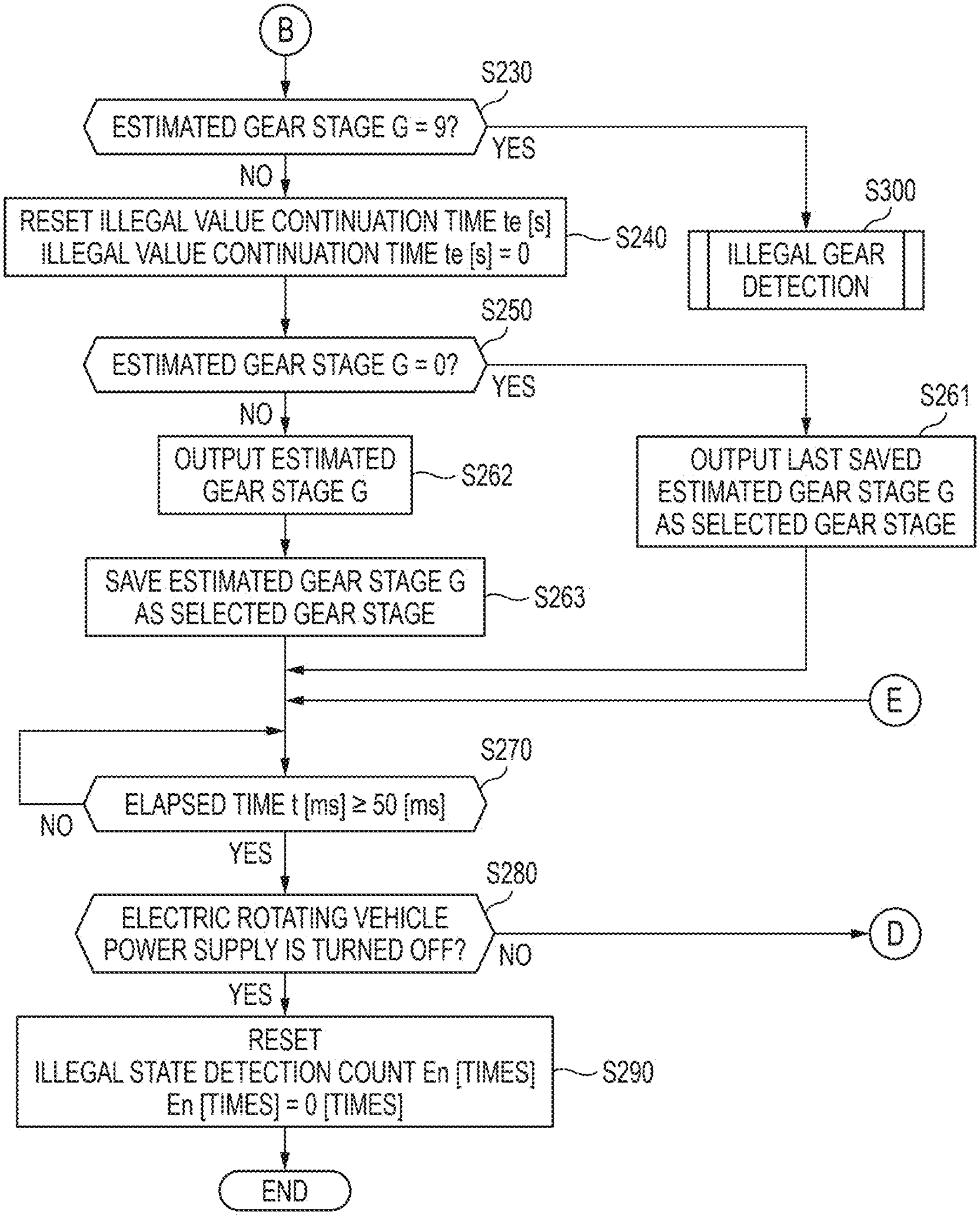
FIG. 7 is a flowchart (part 3) of the gear step estimation process in the electric assist bicycle 10.

As illustrated in FIG. 4, the control device 40 includes: a vehicle state acquisition unit 401 for receiving signals output from the motor rotation speed sensor SE1, the torque sensor SE2, the rear wheel rotation speed sensor SE3, the cadence sensor SE4, the inertial measurement unit 41, and the GNSS 43, thereby acquiring the state of the electric assist bicycle 10, including the vehicle speed V [km/h], the cadence C [rpm], and the pedal torque value Tq [W]; a gear ratio acquisition unit 402 for acquiring a detected gear ratio Rd described later; and a gear step estimation unit 403 for estimating the gear step selected by the switching transmission device 30.

As illustrated in FIGS. 5 to 8, the gear step estimation process starts to execute when the power supply of the electric assist bicycle 10 is turned on.

In the gear step estimation process, first, the process proceeds to step S110. In step S110, the preset gear ratios Ri (i=a natural number of 1 to 8) of the respective gear steps of the switching transmission device 30, that is, the first step to the eighth step in the present embodiment are acquired.

In the present embodiment, in step S110, the first to eighth preset gear ratios Ri (i=a natural number of 1 to 8) are acquired by calculating the preset gear ratio Ri for each gear step using the following equation (3).

$$\text{Preset gear ratio } Ri = \text{number of teeth of front gear/number of teeth of driven sprocket} \quad (3)$$

(i=a natural number of 1 to 8)

Then, the process proceeds to step S120. In step S120, a timer for measuring the elapsed time t [ms] is reset to elapsed time t [ms]=0.

Then, the process proceeds to step S130. In step S130, the timer for measuring the elapsed time t [ms] starts to measure the elapsed time t [ms].

Then, the process proceeds to step S140. In step S140, based on the state of the electric assist bicycle 10 acquired by the vehicle state acquisition unit 401, including the vehicle speed V [km/h], the cadence C [rpm], and the pedal torque value Tq [W], it is determined whether at least one of the following three conditions is satisfied:

$$\text{vehicle speed } V[\text{km}/h] = 0.0[\text{km}/h]$$

-continued $$\text{cadence } C[rpm] \leq 20[rpm]$$

pedal torque value Tq [W]≤50.0 [W]. In a case where at least one of the three conditions is satisfied (step S140: YES), the process proceeds to step S151. In a case where none of the three conditions are satisfied (step S140: NO), the process proceeds to step S152.

In step S151, the gear ratio acquisition unit 402 calculates the detected gear ratio Rd as detected gear ratio Rd=0.0. Then, the process proceeds to step S160.

In step S152, the gear ratio acquisition unit 402 calculates the detected gear ratio Rd using the following equation (4). Then, the process proceeds to step S160.

$$\text{Detected gear ratio } Rd = \text{vehicle speed } V[\text{km}/h] \times (1000/60) / (\text{circumferential length } Ct[\text{m}] \text{ of rear wheel 78/cadence } C[rpm]) \quad (4)$$

In step S160, the detected gear ratio Rd calculated in step S151 or step S152 and the preset gear ratio Ri (i=a natural number of 1 to 8) of each gear step acquired in step S110 are acquired. Then, the process proceeds to step S170.

In step S170, it is determined whether or not there is any i value=m where ΔRi (=|Rd−Ri|)≤match determination allowable value. In the present embodiment, the match determination allowable value is a value that is different for each gear step and is calculated by Ri×0.05 (i=a natural number of 1 to 8). Therefore, according to the present embodiment, in step S170, it is determined whether or not there is any preset gear ratio Ri (i=a natural number of 1 to 8) has an error of 5[%] or less from the detected gear ratio Rd.

In step S170, in the case where there is an i value=m where ΔRi (=|Rd−Ri|)≤match determination allowable value (step S170: YES), the process proceeds to step S191, and the gear step directly read value D=m is stored in the storage medium RAM 40*b*. Then, the process proceeds to step S200.

This can calculate the detected gear ratio Rd based on the vehicle speed V and the cadence C, and estimate at any time which gear step of the switching transmission device 30 is selected by the user based on the detected gear ratio Rd.

In step S170, in the case where there is no i values=m where ΔRi (=|Rd−Ri|)≤match determination allowable value (step S170: NO), the process proceeds to step S180.

In step S180, it is determined whether the detected gear ratio Rd satisfies the following equation (5). In the present embodiment, the match determination allowable value is a value calculated by the preset gear ratio R8×0.05 of the fastest step (the eighth step in the present embodiment).

$$\text{Detected gear ratio } Rd/\text{preset gear ratio } R8 \text{ of fastest step (eighth step in present embodiment)} > 1.0 + \text{match determination allowable value} \quad (5)$$

In step S180, in the case where the detected gear ratio Rd satisfies the above equation (5) (step S180: YES), the process proceeds to step S192, and the gear step directly read value D=9 is stored in the storage medium RAM 40*b*. Then, the process proceeds to step S200. In the present embodiment, the gear steps of the switching transmission device 30 are the first step to the eighth step, and the switching transmission device 30 does not have a ninth step. The gear step directly read value D=9 indicates that the detected gear ratio Rd is an illegal value.

Thus, in the case where the detected gear ratio Rd is an illegal value, the gear step directly read value D=9, and a mark indicating that the detected gear ratio Rd is an illegal value is used as one of the gear step directly read values D. This facilitates data processing, data management, display, and the like in the processing including the gear step estimation process and the illegal gear detection process described later.

In step S180, in the case where the detected gear ratio Rd does not satisfy the above equation (5) (step S180: NO), the process proceeds to step S193, and the gear step directly read value D=0 is stored in the storage medium RAM 40*b*. The gear step directly read value D=0 indicates that the gear step corresponding to the detected gear ratio Rd cannot be read and the gear step is unknown.

As described above, in the case where the gear step is unknown, the gear step directly read value D=0, and a mark indicating that the gear step is unknown is used as one of the gear step directly read values D. This facilitates data processing, data management, display, and the like in the processing including the gear step estimation process and the illegal gear detection process described later.

In step S200, it is determined whether data of the last 20 times on the gear step directly read value D is stored in the storage medium RAM 40*b*.

In step S200, in the case where data of the last 20 times on the gear step directly read value D is not stored in the storage medium RAM 40*b* (step S200: NO), the process returns to step S120.

In step S200, in the case where data of the last 20 times on the gear step directly read value D is stored in the storage medium RAM 40*b* (step S200: YES), the process proceeds to step S210 to acquire the gear step directly read value D of the last 20 times. Then, the process proceeds to step S220.

In step S220, with reference to the gear step directly read values D of the last 20 times, a gear step directly read value Dm having the largest number of appearances is estimated as the currently selected gear step, and the estimated gear step G=Dm. Then, the process proceeds to step S230.

In this way, with reference to the plurality of gear step directly read values D, the gear step directly read value Dm having the largest number of appearances is estimated as the currently selected gear step. This can reduce the frequency of erroneous estimation. In particular, this can avoid erroneous estimation due to a detection value error of the detected gear ratio Rd during the transition of the gear step. Accordingly, it is possible to estimate which gear step of the switching transmission device 30 is selected by the user with high accuracy.

In step S230, it is determined whether the estimated gear step G estimated in step S220 is 9, that is, the estimated gear step G=9.

In step S230, in the case where it is determined that the estimated gear step G estimated in step S220 is 9, that is, the estimated gear step G=9 (step S230: YES), the process proceeds to step S300 to execute the illegal gear detection process. Details of the illegal gear detection process in step S300 will be described later.

In step S230, in the case where it is determined that the estimated gear step G estimated in step S220 is not 9, that is, the estimated gear step G is not 9 (step S230: NO), the process proceeds to step S240 to reset an illegal value continuation time te [s] described later to illegal value continuation time te [s]=0. Then, the process proceeds to step S250.

In step S250, it is determined whether the estimated gear step G estimated in step S220 is 0, that is, the estimated gear step G=0.

In step S250, in the case where it is determined that the estimated gear step G estimated in step S220 is 0, that is, the estimated gear step G=0 (step S250: YES), the process proceeds to step S261. In step S261, the last estimated gear step G saved in the storage medium ROM 40*c* is output to the portable terminal 8. Then, the display unit 8*a* of the portable terminal 8 displays the estimated gear step G as the selected gear step. Then, the process proceeds to step S270.

Thus, the estimated gear step G estimated immediately before is estimated as the estimated gear step G in the case where the last estimated gear step G estimated in step S220 is 0, that is, the gear step is unknown. Thereby, the last estimated gear step G estimated is estimated as the estimated gear step G even in the case where, for example, the electric assist bicycle 10 is temporarily in an idle state. This can reduce the strange feeling of the user in the estimation result of the gear step.

In step S250, in the case where it is determined that the estimated gear step G estimated in step S220 is not 0, that is, the estimated gear step G is not 0, in other words, the estimated gear step G is 1 to 8 in consideration of step S230 (step S250: NO), the process proceeds to step S262. In step S262, the estimated gear step G estimated in step S220 is output to the portable terminal 8. The display unit 8*a* of the portable terminal 8 displays the estimated gear step G as the selected gear step. Then, the process proceeds to step S263. In step S263, the estimated gear step G estimated in step S220 is stored in the storage medium ROM 40*c*. Then, the process proceeds to step S270.

As a result, even an electric assist bicycle 10 without a shift indicator function can be retrofitted to have a shift indicator function by outputting the estimated gear step G to the portable terminal 8.

In step S270, it is determined whether the elapsed time t [ms] measured in step S130 is elapsed time t [ms]≥50 [ms] or more. In step S270, the standby state is maintained until the elapsed time t [ms]≥50 [ms] or more (step S270: loop of NO), and the process proceeds to step S280 when the elapsed time t [ms]≥50 [ms] or more.

In step S280, it is determined whether the power supply of the electric assist bicycle 10 is turned off. In step S280, in the case where the power supply of the electric assist bicycle 10 is not turned off (step S280: NO), the process returns to step S120, and in the case where the power supply of the electric assist bicycle 10 is turned off (step S280: YES), the process proceeds to step S290.

The processes of step S170 to step S280 are performed by, for example, the gear step estimation unit 403.

In step S290, the illegal state detection count En [times] is reset to illegal state detection count En [times]=0 [times], and the series of processes is ended.

In this way, until the power supply of the electric assist bicycle 10 is turned off, the gear step directly read value D is acquired every predetermined time (50 [ms] in the present embodiment), and it is estimated at any time which gear step of the switching transmission device 30 is selected by the user.

Incidentally, the user often changes the gear step in the case where the user causes the electric assist bicycle to idle for a predetermined time and then stop. In the gear step estimation process, as described above, in step S140 and step S151, it is calculated that the detected gear ratio Rd=0.0 in the case where any one of the three conditions including vehicle speed V [km/h]=0.0 [km/h], cadence C [rpm]≤20 [rpm], and pedal torque value Tq [W]≤50.0 [W] is satisfied. Accordingly, the estimated gear step G=0 in the case where the user causes the electric assist bicycle 10 to idle for a predetermined time and then stop. Thus, it is calculated that the detected gear ratio Rd=0.0 and it is estimated that the estimated gear step G=0 in the case where the user causes the electric assist bicycle 10 to idle for a predetermined time and then stop. This can reset the detected gear ratio Rd and the estimated gear step G.

[Illegal Gear Detection Process]

Figure 8:
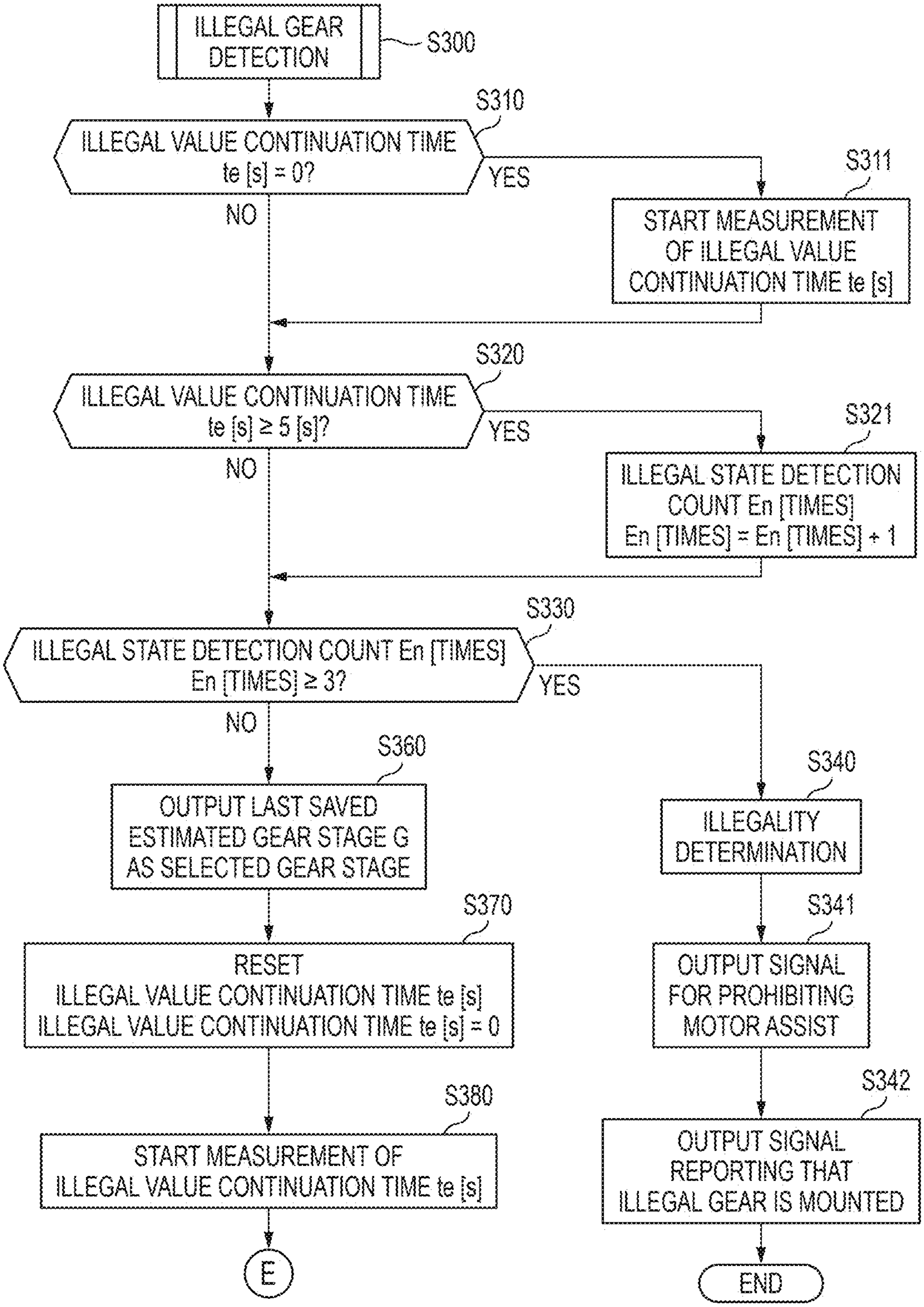
FIG. 8 is a flowchart of the illegal gear detection process in the electric assist bicycle 10.

Next, details of the illegal gear detection process in step S300 will be described with reference to FIG. 8. The illegal gear detection process is performed by, for example, the gear step estimation unit 403.

In the illegal gear detection process, first, the process proceeds to step S310. In step S310, it is determined whether the illegal value continuation time te [s]=0.

In step S310, in the case where the illegal value continuation time te [s]=0 (step S310: YES), the process proceeds to step S311. In step S311, the measurement of the illegal value continuation time te [s] is started. Then, the process proceeds to step S320.

In step S310, in the case where the illegal value continuation time te [s] is not 0 (step S310: NO), the process proceeds to step S320.

In step S320, in step S310, it is determined whether the illegal value continuation time te [s]≥5 [s], that is, whether the illegal value continuation time te [s] exceeds 5 seconds.

In step S320, in the case where the illegal value continuation time te [s]≥5 [s](step S310: YES), the process proceeds to step S321. At step S321, the illegal state detection count En [times] is set to En+1 [times]. That is, the illegal state detection count En [times] is added by 1 [time]. Then, the process proceeds to step S330.

In step S320, in the case where the illegal value continuation time te [s]≥5 [s] is not satisfied (step S310: NO), the process proceeds to step S330.

In step S330, it is determined whether the illegal state detection count En [times]≥3 [times], that is, the illegal state detection count En [times] is 3 [times] or more.

In step S330, in the case where the illegal state detection count En [times]≥3 [times], that is, the illegal state detection count En [times] is 3 [times] or more (step S330: YES), the process proceeds to step S340.

In step S340, illegality determination process is executed. The illegality determination process executes at least one of the following (i) to (iii). In the present embodiment, the following (i) to (iii) are executed in order. Then, the process proceeds to step S341.

(i) Determining an abnormal occurrence in the power transmission mechanism T.

In the present embodiment, it is determined that an illegal gear is mounted on the power transmission mechanism T.

(ii) Generating information for limiting or prohibiting a drive using the power transmission mechanism T.

In the present embodiment, information for prohibiting the drive of the motor M is generated.

(iii) Generating information for reporting to at least one of the rider (user) of the electric assist bicycle 10, the party which mounts the vehicle body and the power unit 20, the party which manufactures the electric assist bicycle 10, the party which manufactures the power unit 20, the party which manages the electric assist bicycle 10, the party which manages the power unit 20, the party which certifies the electric assist bicycle 10, or the regulatory party of the electric assist bicycle 10.

In the present embodiment, information for reporting to the rider (user) on the electric assist bicycle 10 that an illegal gear is mounted on the power transmission mechanism T is generated.

In step S341, a signal including the information for prohibiting the drive of the motor M generated in the process of (ii) of step S340 is output. When the signal including the information for prohibiting the drive of the motor M is output in step S341, the assist by the motor M is prohibited in the electric assist bicycle 10. The user cannot cancel the assist prohibited state. For example, the assist prohibited state cannot be cancelled unless the vehicle is brought into a shop or the like and operated with a dedicated device. Then, the process proceeds to step S342.

In step S342, the signal generated in the process of (iii) of step S340 and including the information for reporting that an illegal gear is mounted in the power transmission mechanism T is output to the portable terminal 8. Then, the display unit 8*a* of the portable terminal 8 displays that an illegal gear is mounted on the power transmission mechanism T. For example, in the display unit 8*a* of the portable terminal 8, "error" is displayed in a region indicating the selected gear step.

In this way, with the process of (i) in step S340, the state of the electric assist bicycle 10 not complying with the regulations can be detected. With the process of (ii), it is possible to avoid using the electric assist bicycle 10 in the state of not complying with the regulations. With the processing of (iii), the user or the like can recognize that remodeling and improvement causing the regulation noncompliance state are performed on the electric assist bicycle 10.

On the other hand, in step S330, in the case where it is not satisfied that the illegal state detection count En [times]≥3 [times], that is, the illegal state detection count En [times] is 2 [times] or less (step S330: NO), the process proceeds to step S360.

In step S360, the estimated gear step G saved in the storage medium ROM 40*c* as the last gear step in the last step S263 is output to the portable terminal 8. Then, the display unit 8*a* of the portable terminal 8 displays the estimated gear step G as the selected gear step. Then, the process proceeds to step S370.

In step S370, the illegal value continuation time te [s] is reset to illegal value continuation time te [s]=0. Then, the process proceeds to step S380.

In step S380, the measurement of the illegal value continuation time te [s] is started again. Then, the illegal gear detection process is ended, and the process proceeds to step S270 of the gear step estimation process.

Figure 9:
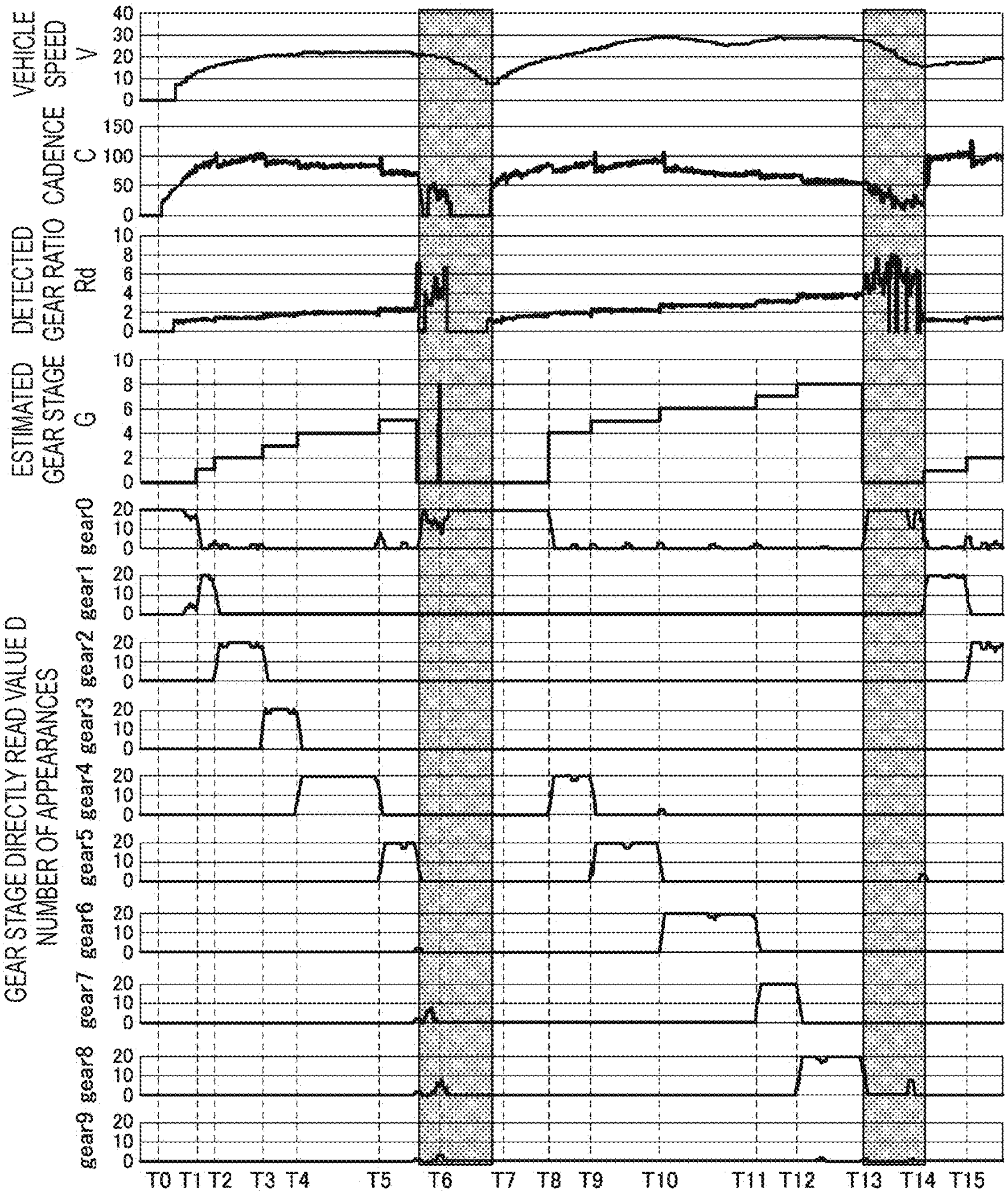
FIG. 9 is a time-series change graph illustrating a first example of executing the gear step estimation process in the electric assist bicycle 10.

FIG. 9 is a time-series change graph illustrating a first example of executing the above-described gear step estimation process in the electric assist bicycle 10.

In FIG. 9, the uppermost graph is a graph representing a time series of the vehicle speed V [km/h]. The second graph from the top is a graph illustrating a time series of the cadence C [rpm]. The third graph from the top is a graph illustrating a time series of the detected gear ratio Rd calculated in step S151 or step S152 of the gear step estimation process. The fourth graph from the top is a graph illustrating a time series of the estimated gear step G estimated in the gear step estimation process.

Further, in FIG. 9, the fifth graph from the top is a graph illustrating a time series of the number of appearances of the gear step directly read value D=0 for the gear step directly read values D of the last 20 times in step S220 of the gear step estimation process. The sixth graph from the top is a graph illustrating a time series of the number of appearances of the gear step directly read value D=1 for the gear step directly read values D of the last 20 times in step S220 of the gear step estimation process. The seventh graph from the top is a graph illustrating a time series of the number of appearances of the gear step directly read value D=2 for the gear step directly read values D of the last 20 times in step S220 of the gear step estimation process. The eighth graph from the top is a graph illustrating a time series of the number of appearances of the gear step directly read value D=3 for the gear step directly read values D of the last 20 times in step S220 of the gear step estimation. The ninth graph from the top is a graph illustrating a time series of the number of appearances of the gear step directly read value D=4 for the gear step directly read values D of the last 20 times in step S220 of the gear step estimation process. The 10-th graph from the top is a graph illustrating a time series of the number of appearances of the gear step directly read value D=5 for the gear step directly read values D of the last 20 times in step S220 of the gear step estimation. The 11-th graph from the top is a graph illustrating a time series of the number of appearances of the gear step directly read value D=6 for the gear step directly read values D of the last 20 times in step S220 of the gear step estimation process. The 12-th graph from the top is a graph illustrating a time series of the number of appearances of the gear step directly read value D=7 for the gear step directly read values D of the last 20 times in step S220 of the gear step estimation process. The 13-th graph from the top is a graph illustrating a time series of the number of appearances of the gear step directly read value D=8 for the gear step directly read values D of the last 20 times in step S220 of the gear step estimation process. The 14-th graph from the top is a graph illustrating a time series of the number of appearances of the gear step directly read value D=9 for the gear step directly read values D of the last 20 times in step S220 of the gear step estimation process.

Therefore, the fourth graph from the top illustrates the gear step directly read value Dm having the largest number of appearances as the estimated gear step G=Dm based on the fifth to 14-th graphs from the top.

For example, in FIG. 9, at a time point TO, the cadence C [rpm] starts to increase, and the vehicle speed V [km/h] also starts to increase subsequently. Then, at a time point T1, the number of appearances of the gear step directly read value D=1 is the largest among the gear step directly read values D of the last 20 times, and it is estimated that the estimated gear step G=1.

Then, at a time point T2, the number of appearances of the gear step directly read value D=2 is the largest among the gear step directly read values D of the last 20 times, and it is estimated that the estimated gear step G=2. Similarly, at a time point T3, the number of appearances of the gear step directly read value D=3 is the largest, and it is estimated that the estimated gear step G=3; at a time point T4, the number of appearances of the gear step directly read value D=4 is the largest, and it is estimated that the estimated gear step G=4; and at a time point T5, the number of appearances of the gear step directly read value D=5 is the largest, and it is estimated that the estimated gear step G=5.

The cadence C [rpm] is rapidly decreases when a time point T6 is passed. The cadence C [rpm] temporarily increases between the time point T6 and a time point T7, but the cadence C [rpm] is close to zero most of the time. This indicates that the user stops the pedal operation on the electric assist bicycle 10 and the electric assist bicycle 10 is in the idle state. When the electric assist bicycle 10 is in the idle state, the vehicle speed V [km/h] and the cadence C [rpm] are no longer correlated with each other. Therefore, for most of the period between the time point T6 and the time point T7, the number of appearances of the gear step directly read value D=0 is the largest, and it is estimated that the estimated gear step G=0, that is, the gear step is unknown. At this time, as described above, in step S261, the last saved estimated gear step G=5 is output to the portable terminal 8 as the selected gear step.

After the time point T7 is passed, the cadence C [rpm] rapidly increases, and the vehicle speed V [km/h] also starts to increase subsequently. Immediately after time point T7, the number of appearances of the gear step directly read value D=0 is the largest among the gear step directly read values D of the last 20 times, and the estimated gear step G=0 remains unchanged. However, after a predetermined time has elapsed and it reaches a time point T8, the number of appearances of the gear step directly read value D=4 is the largest, and the estimated gear step G transitions to 4. The reason is considered as that the correlation between the vehicle speed V [km/h] and the cadence C [rpm] is still low immediately after the electric assist bicycle 10 transitions from the idle state to pedal-powered driving, and that the user switched the gear step from the fifth step to the fourth step between the time point T7 and the time point T8.

Then, at a time point T9, the number of appearances of the gear step directly read value D=5 is the largest among the gear step directly read values D of the last 20 times, and it is estimated that the estimated gear step G=5. Similarly, at a time point T10, the number of appearances of the gear step directly read value D=6 is the largest, and it is estimated that the estimated gear step G=6; at a time point T11, the number of appearances of the gear step directly read value D=7 is the largest, and it is estimated that the estimated gear step G=7; and at a time point T12, the number of appearances of the gear step directly read value D=8 is the largest, and it is estimated that the estimated gear step G=8.

After a time point T13, both the vehicle speed V [km/h] and the cadence C [rpm] decrease. Between the time point T13 and a time point T14, it is considered that the pedal torque value Tq [W] decreases and the pedal is substantially idling. Therefore, during the period from the time point T13 to the time point T14, the vehicle speed V [km/h] and the cadence C [rpm] are correlated with each other. For most of the period between the time point T6 and the time point T7, the number of appearances of the gear step directly read value D=0 is the largest, and it is estimated that the estimated gear step G=0, that is, the gear step is unknown.

When the time point T14 is passed, the cadence C [rpm] rapidly increases, the vehicle speed V [km/h] also starts to increase, the number of appearances of the gear step directly read value D=1 is the largest among the gear step directly read values D of the last 20 times, and it is estimated that the estimated gear step G=1. Then, at a time point T15, the number of appearances of the gear step directly read value D=2 is the largest among the gear step directly read values D of the last 20 times, and it is estimated that the estimated gear step G=2.

Figure 10:
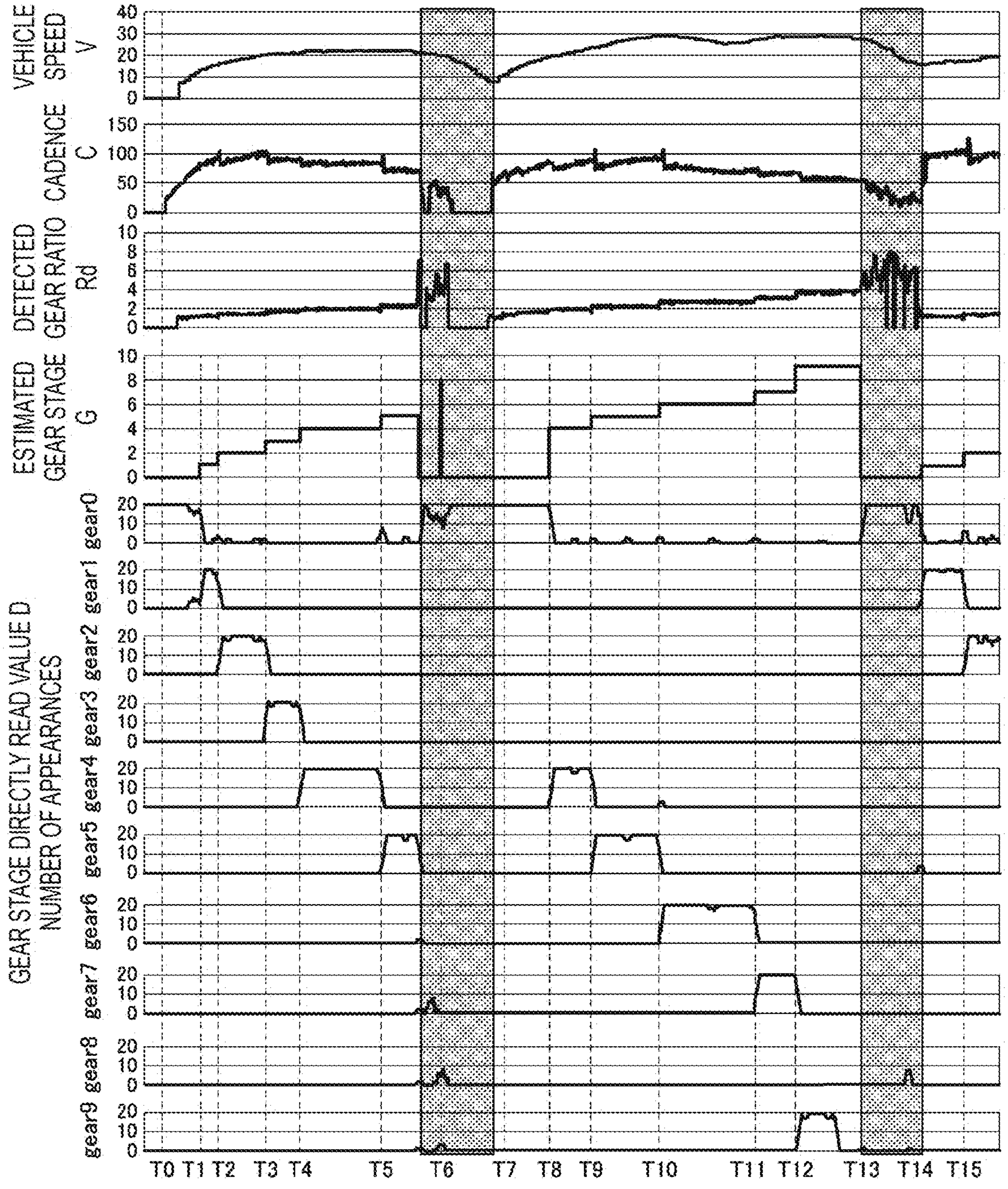
FIG. 10 is a time-series change graph illustrating a second example of executing the gear step estimation process in the electric assist bicycle 10.

FIG. 10 is a time-series change graph illustrating a second example of executing the above-described gear step estimation process in the electric assist bicycle 10. Here, only the difference from the first example described above will be described in detail, and the description of the same aspect as the first example will be omitted or simplified.

In this example, the number of appearances of the gear step directly read value D=9 is the largest between the time point T12 and the time point T13, and it is estimated that the estimated gear step G=9. In this case, the above-described illegal gear detection process is executed, and, the illegal state detection count En [times] is counted as 1 [time] by the above-described step S321 in the case where the time from the time point T12 to the time point T13 is 5 [s] or more. At this time, as described above, in step S360, the last saved estimated gear step G=7 is output to the portable terminal 8 as the selected gear step. Then, when the illegal state detection count En [times] becomes 3 [times] or more before the power supply of the electric assist bicycle 10 is turned off, the above-described step S340 to step S342 are executed, the assist by the motor M is prohibited in the electric assist bicycle 10, and "error" is displayed in the region indicating the selected gear step on the display unit 8*a* of the portable terminal 8.

Although an embodiment of the present disclosure has been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, the constituent elements in the above embodiments may be freely combined without departing from the gist of the invention.

For example, in the present embodiment, although the electric assist bicycle 10 is exemplified as a vehicle, the present invention is not limited thereto, and the vehicle may be a two-wheeled vehicle without input from the crank pedal 79, or a three-wheeled vehicle or a four-wheeled vehicle instead of a two-wheeled vehicle.

Further, for example, although a case where a non-electric assist bicycle after sale is retrofitted with the assist device has been described in the present embodiment described above, the present invention is not necessarily limited to a non-electric assist bicycle after sale, and can also be applied to a completed vehicle obtained by mounting, at a dealer or the like, the assist device to a new non-electric assist bicycle. The present invention can also be applied to a completed vehicle manufactured in a factory for mounting the assist device which is the same site where the vehicle body is manufactured (that is, an electric assist bicycle completed vehicle factory).

For example, in the present embodiment, the gear step estimation process is constantly executed from when the power supply of the electric assist bicycle 10 is turned on to when the power supply is turned off, but the electric assist bicycle 10 may enter a standby state without executing the gear step estimation process in the case where, for example, the pedal torque value Tq [W] is below a predetermined value, for example, in the case where the pedal torque value Tq [W]≤50.0 [W]. Further, for example, in the present embodiment, the process proceeds to step S151 in the case where step S140 is YES in the gear step estimation process, but the process may return to step S140 and wait until step S140 becomes NO in the case where step S140 is YES. In this case, until step S140 becomes NO, the selected gear step may be assumed to be the estimated gear step G that is last estimated, and the display unit 8*a* of the portable terminal 8 may display the estimated gear step G that is last estimated as the selected gear step.

Further, for example, in the present embodiment, the execution of the gear step estimation process is started when the power supply of the electric assist bicycle 10 is turned on, and in step S110, the preset gear ratios Ri (i=a natural number of 1 to 8) of the first to eighth steps are acquired by calculating the preset gear ratio Ri (i=a natural number of 1 to 8) for each gear step using the above-described equation (3), but the preset gear ratio Ri of each gear step may be stored in advance in the storage medium ROM 40*c* in a dealer or the like of the electric assist bicycle 10.

Further, for example, in the present embodiment, in the gear step estimation process, when the estimated gear step G=0 (step S250: YES), the last saved estimated gear step G is output to the portable terminal 8 as the selected gear step (step S261), but step S261 may also output to the portable terminal 8 that the estimated gear step G=0. In this case, the area indicating the selected gear step on the display unit 8*a* of the portable terminal 8 may display nothing.

In addition, for example, the gear step estimation process may further include a step of executing at least one of the following (i) to (iii) before or after step S261 in the case where the estimated gear step G=0 in step S250 (step S250: YES).

(i) Determining an abnormal occurrence in the power transmission path (ii) Generating information for limiting or prohibiting a drive using the power transmission path (iii) Generating information for reporting to at least one of the rider (user) of the electric assist bicycle 10, the party which manufactures the electric assist bicycle 10, the party which manages the electric assist bicycle 10, the party which certifies the electric assist bicycle 10, and the regulatory party of the electric assist bicycle 10

Further, for example, in the present embodiment, it is estimated that the estimated gear step G=0 in the case where the user stops the electric assist bicycle 10 after causing the electric assist bicycle 10 to idle for a predetermined time, but the estimated gear step G may be estimated as a preset initial value without being limited to the estimated gear step G=0 when the vehicle speed V of the power-assisted bicycle becomes a predetermined threshold or less. Thus, the estimated gear step G is estimated as the initial value in the case where the user causes the electric assist bicycle 10 to idle for a predetermined time and then stop. This can reset the detected gear ratio Rd and the estimated gear step G.

For example, in the present embodiment, the illegal gear detection process is performed, for example, by the gear step estimation unit 403, but the control device 40 may be provided with an illegal gear detection unit for performing the illegal gear detection process separate from the gear step estimation unit 403.

In the present specification, at least the following matters are described. In the parentheses, the corresponding constituent elements and the like in the above embodiment are shown as an example, but the present invention is not limited thereto.

(1) A gear step estimation method of estimating a gear step of a switching transmission device (switching transmission device 30) in a vehicle (electric assist bicycle 10) including a power source (motor M), and the switching transmission device provided in a power transmission path between the power source and a wheel (rear wheel 78), and capable of switching the gear step among n gear steps (n is a natural number of 2 or more), the gear step estimation method including:

a step of acquiring, at a first time, a first gear ratio (detected gear ratio Rd) that is a gear ratio of a transmission section including the switching transmission device, the transmission section being a whole or a part of the power transmission path;

a step of comparing the acquired first gear ratio with n reference values (preset gear ratios Ri) set within a range of possible gear ratios taken by the n gear steps; and a step of estimating the gear step of the switching transmission device as an m-step (m is a natural number of 1 or more and n or less) in a case where the first gear ratio matches an m-th reference value from a smallest among the n reference values.

According to (1), it is possible to estimate at any time which gear step of the switching transmission device is selected by the user. In addition, even a vehicle without a shift indicator function can be easily retrofitted to have a shift indicator function. The reference value may be a single value or may be values having an upper limit value and a lower limit value.

(2A) The gear step estimation method according to (1), further including:

a step of acquiring, at a second time after the first time, a second gear ratio (detected gear ratio Rd) that is a gear ratio of the transmission section;

a step of comparing the acquired second gear ratio with the n reference values;

a step of estimating the gear step of the switching transmission device as a p-step (p is a natural number of 1 or more and n or less) in a case where the second gear ratio matches a p-th reference value from the smallest among the n reference values; and a step of estimating, based on the m-step estimated at the first time and the p-step estimated at the second time, the gear step of the switching transmission device as the m-step or the p-step.

(2B) The gear step estimation method according to (1), further including:

a step of acquiring, at a second time after the first time, a second gear ratio (detected gear ratio Rd) that is a gear ratio of the transmission section;

a step of comparing the acquired second gear ratio with the n reference values;

a step of estimating the gear step of the switching transmission device as a p-step (p is a natural number of 1 or more and n or less) in a case where the second gear ratio matches a p-th reference value from the smallest among the n reference values; and a step of estimating, based on the m-step estimated at the first time and the p-step estimated at the second time, the gear step of the switching transmission device at the second time, a current time after the second time, or any time between the second time and the current time as the m-step or the p-step.

According to (2A) and (2B), based on the m-step estimated at the first time and the p-step estimated at the second time, the gear step of the switching transmission device is estimated as the m-step or the p-step. This can reduce the frequency of erroneous estimation.

(3A) The gear step estimation method according to (2A) or (2B), further including: a step of acquiring, at a third time after the second time, a third gear ratio (detected gear ratio Rd) that is a gear ratio of the transmission section;

a step of comparing the acquired third gear ratio with the n reference values;

a step of estimating the gear step of the switching transmission device as a q-step (q is a natural number of 1 or more and n or less) in a case where the third gear ratio matches a q-th reference value from the smallest among the n reference values; and a step of estimating, based on the m-step estimated at the first time, the p-step estimated at the second time, and the q-step estimated at the third time, the gear step of the switching transmission device as a gear step having a largest number of appearances among the m-step, the p-step and the q-step.

(3B) The gear step estimation method according to (2A) or (2B), further including:

a step of acquiring, at a third time after the second time, a third gear ratio (detected gear ratio Rd) that is a gear ratio of the transmission section;

a step of comparing the acquired third gear ratio with the n reference values;

a step of estimating the gear step of the switching transmission device as a q-step (q is a natural number of 1 or more and n or less) in a case where the third gear ratio matches a q-th reference value from the smallest among the n reference values; and a step of estimating, based on the m-step estimated at the first time, the p-step estimated at the second time, and the q-step estimated at the third time, the gear step of the switching transmission device at the third time, a current time after the third time, or any time between the third time and the current time as a gear step having a largest number of appearances among the m-step, the p-step and the q-step.

According to (3A) and (3B), based on the m-step estimated at the first time, the p-step estimated at the second time, and the q-step estimated at the third time, the gear step of the switching transmission device is estimated as the gear step having the largest number of appearances among the m-step, the p-step, and the q-step. This can reduce the frequency of erroneous estimation. In particular, this can avoid erroneous estimation due to a detection value error of the detected gear ratio during the transition of the gear step.

(4) The gear step estimation method according to (3A) or (3B), further including: a step of estimating the gear step of the switching transmission device as the gear step last estimated as the gear step of the switching transmission device, when no gear step has the largest number of appearances.

According to (4), the gear step of the switching transmission device is estimated as the gear step last estimated as the gear step of the switching transmission device, when no gear step has the largest number of appearances. This can reduce the strange feeling of the user in the estimation result of the gear step.

(5) The gear step estimation method according to (1), further including:

a step of estimating, at a fourth time, the gear step of the switching transmission device as a gear step having a largest number of appearances, in a case where the gear step is estimated a plurality of times for a predetermined period before the fourth time.

According to (5), the gear step having the largest number of appearances is estimated as the gear step. This can reduce the frequency of erroneous estimation. In particular, this can avoid erroneous estimation due to a detection value error of the detected gear ratio during the transition of the gear step.

(6) The gear step estimation method according to any one of (1) to (5), further including:

a step of, when comparing the first gear ratio with the n reference values, executing at least one of (i) to (iii), in a case where the first gear ratio is smaller than the reference value of a minimum gear step among the n reference values or larger than the reference value of a maximum gear step among the n reference values, in which (i) determining an abnormal occurrence in the power transmission path, (ii) generating information for limiting or prohibiting a drive using the power transmission path, and (iii) generating information for reporting to at least one of an occupant of the vehicle, a party which manufactures the vehicle, a party which manages the vehicle, a party which certifies the vehicle, and a regulatory party of the vehicle.

According to (6), with the process of (i), an abnormal occurrence in the power transmission path can be detected. With the process of (ii), a continuation of the drive using the power transmission path with an abnormal occurrence in the power transmission path can be avoided. With the process of (iii), the user or the like can recognize an abnormal occurrence in the power transmission path.

(7) The gear step estimation method according to any one of (1) to (6), further including:

a step of, when comparing the first gear ratio with the n reference values, estimating the gear step of the switching transmission device as an [n+1]-th step, in a case where the first gear ratio is larger than the reference value of a maximum gear step among the n reference values.

According to (7), the gear step is estimated as the [n+1]-th step and is treated as one of the gear steps in a case where the first gear ratio is larger than the reference value of the maximum gear step among the n reference values. This facilitates data processing, data management, display, and the like in the processing including the gear step estimation process and the illegal gear detection process described later.

(8) The gear step estimation method according to any one of (1) to (7), further including:

a step of, when comparing the first gear ratio with the n reference values, estimating the gear step of the switching transmission device as a 0-step, in a case where the gear ratio of the transmission section cannot be acquired or in a case where the gear step cannot be estimated.

According to (8), the gear step is estimated as the 0-step and is treated as one of the gear steps in a case where the gear ratio of the transmission section cannot be acquired or in a case where the gear step cannot be estimated. This facilitates data processing, data management, display, and the like in the processing including the gear step estimation process and the illegal gear detection process described later.

(9) The gear step estimation method according to any one of (1) to (8), further including:

a step of estimating the gear step of the switching transmission device as an initial value, when a travel distance of the vehicle per unit time (vehicle speed V) becomes a predetermined threshold or less at a fifth time after the first time.

According to (9), the gear step is estimated as the initial value when the speed of the vehicle becomes the predetermined threshold or less. This can reset the estimation result of the gear step selected by the switching transmission device when the user stops the vehicle.

(10) The gear step estimation method according to any one of (1) to (9), in which the power source includes an electric motor and a stepping force input unit, and the vehicle is an electric power-assisted bicycle capable of generating an assist force by the electric motor based on an input value (pedal torque value Tq) applied by a user to the stepping force input unit and a travel distance of the vehicle per unit time (vehicle speed V).

According to (10), it is possible to estimate at any time which gear step of the switching transmission device is selected by the user in the electric power-assisted bicycle. In addition, even an electric power-assisted bicycle without a shift indicator function can be easily retrofitted to have a shift indicator function.

(11) A gear step estimation program of estimating a gear step of a switching transmission device (switching transmission device 30) in a vehicle (electric assist bicycle 10) including a power source (motor M), and the switching transmission device provided in a power transmission path between the power source and a wheel (rear wheel 78), and capable of switching the gear step among n gear steps (n is a natural number of 2 or more), the gear step estimation program causing a processor (CPU 40*a*) to execute:

a process of acquiring, at a first time, a first gear ratio (detected gear ratio Rd) that is a gear ratio of a transmission section including the switching transmission device, the transmission section being a whole or a part of the power transmission path;

a process of comparing the acquired first gear ratio with n reference values (preset gear ratios Ri) set within a range of possible gear ratios taken by the n gear steps; and a process of estimating the gear step of the switching transmission device as an m-step (m is a natural number of 1 or more and n or less) in a case where the first gear ratio matches an m-th reference value from a smallest among the n reference values.

According to (11), it is possible to estimate at any time which gear step of the switching transmission device is selected by the user. In addition, even a vehicle without a shift indicator function can be easily retrofitted to have a shift indicator function.

(12) A storage medium (ROM 40*c*) that stores the gear step estimation program according to (11).

According to (12), the gear step estimation program described in (11) can be executed by the processor mounted on the vehicle.

(13) A gear step estimation device (control device 40) that estimates a gear step of a switching transmission device (switching transmission device 30) in a vehicle (electric assist bicycle 10) including a power source (motor M), and the switching transmission device provided in a power transmission path between the power source and a wheel (rear wheel 78), and capable of switching the gear step among n gear steps (n is a natural number of 2 or more), the gear step estimation device including:

an acquisition unit (gear ratio acquisition unit 402) configured to acquire, at a first time, a first gear ratio (detected gear ratio Rd) that is a gear ratio of a transmission section including the switching transmission device, the transmission section being a whole or a part of the power transmission path; and an estimation unit (gear step estimation unit 403) configured to compare the first gear ratio acquired by the acquisition unit with n reference values (preset gear ratios Ri) set within a range of possible gear ratios taken by the n gear steps, and estimate the gear step of the switching transmission device as an m-step (m is a natural number of 1 or more and n or less) in a case where it is determined that the first gear ratio matches an m-th reference value from a smallest among the n reference values.

According to (13), it is possible to estimate at any time which gear step of the switching transmission device is selected by the user. In addition, even a vehicle without a shift indicator function can be easily retrofitted to have a shift indicator function. The gear step estimation device may be an in-vehicle computer or a computer of a remote server. In a case where the gear step estimation device is a computer of a remote server, the acquisition unit corresponds to a reception unit for acquiring gear ratio data transmitted from the vehicle.

REFERENCE SIGNS LIST

10: electric assist bicycle (vehicle, electric power-assisted bicycle)
30: switching transmission device
40: control device (gear step estimation device)
40*a*: CPU (processor)
40*c*: ROM (storage medium)
402: gear ratio acquisition unit (acquisition unit)
403: gear step estimation unit (estimation unit)
78: rear wheel (wheel)
79: crank pedal (power source)
M: motor (power source)
Rd: detected gear ratio (first gear ratio)
Rd: detected gear ratio (second gear ratio)
Rd: detected gear ratio (third gear ratio)
Ri: preset gear ratio (reference value)
Tq: pedal torque value (input value)
V: vehicle speed (travel distance of vehicle per unit time)

The invention claimed is:

1. A gear step estimation method of estimating a gear step of a switching transmission device in a vehicle including
a power source, and
the switching transmission device provided in a power transmission path between the power source and a wheel, and capable of switching the gear step among n gear steps (n is a natural number of 2 or more),
the gear step estimation method including:
acquiring, at a first time, a first gear ratio that is a gear ratio of a transmission section including the switching transmission device, the transmission section being a whole or a part of the power transmission path;
comparing the acquired first gear ratio with n reference values set within a range of possible gear ratios taken by the n gear steps;
estimating the gear step of the switching transmission device as an m-step (m is a natural number of 1 or more and n or less) in a case where the first gear ratio matches an m-th reference value from a smallest among the n reference values; and
controlling the vehicle based on the estimated gear step, or outputting the estimated gear step to a vehicle controller of the vehicle or a display device,
the gear step estimation method further including:
acquiring, at a second time after the first time, a second gear ratio that is a gear ratio of the transmission section;
comparing the acquired second gear ratio with the n reference values;
estimating the gear step of the switching transmission device as a p-step (p is a natural number of 1 or more and n or less) in a case where the second gear ratio matches a p-th reference value from the smallest among the n reference values; and
estimating, based on the m-step estimated at the first time and the p-step estimated at the second time, the gear step of the switching transmission device as the m-step or the p-step.

2. The gear step estimation method according to claim 1, further including:
acquiring, at a third time after the second time, a third gear ratio that is a gear ratio of the transmission section;
comparing the acquired third gear ratio with the n reference values;
estimating the gear step of the switching transmission device as a q-step (q is a natural number of 1 or more and n or less) in a case where the third gear ratio matches a q-th reference value from the smallest among the n reference values; and
estimating, based on the m-step estimated at the first time, the p-step estimated at the second time, and the q-step estimated at the third time, the gear step of the switching transmission device as a gear step having a largest number of appearances among the m-step, the p-step and the q-step.

3. The gear step estimation method according to claim 2, further including:
estimating the gear step of the switching transmission device as the gear step last estimated as the gear step of the switching transmission device, when no gear step has the largest number of appearances.

4. The gear step estimation method according to claim 1, further including:
estimating, at a fourth time, the gear step of the switching transmission device as a gear step having a largest number of appearances, in a case where the gear step is estimated a plurality of times for a predetermined period before the fourth time.

5. The gear step estimation method according to claim 1, further including:
when comparing the first gear ratio with the n reference values,
executing at least one of (i) to (iii), in a case where the first gear ratio is smaller than a reference value of a minimum gear step among the n reference values or larger than a reference value of a maximum gear step among the n reference values, wherein
(i) determining an abnormal occurrence in the power transmission path,
(ii) generating information for limiting or prohibiting a drive using the power transmission path, and
(iii) generating information for reporting to at least one of an occupant of the vehicle, a party which manufactures the vehicle, a party which manages the vehicle, a party which certifies the vehicle, and a regulatory party of the vehicle.

6. The gear step estimation method according to claim 1, further including:
when comparing the first gear ratio with the n reference values,
estimating the gear step of the switching transmission device as an [n+1]-th step, in a case where the first gear ratio is larger than a reference value of a maximum gear step among the n reference values.

7. The gear step estimation method according to claim 1, further including:
when comparing the first gear ratio with the n reference values, estimating the gear step of the switching transmission device as a 0-step, in a case where the gear ratio of the transmission section cannot be acquired or in a case where the gear step cannot be estimated.

8. The gear step estimation method according to claim 1, further including:

estimating the gear step of the switching transmission device as an initial value, when a travel distance of the vehicle per unit time becomes a predetermined threshold or less at a fifth time after the first time.

9. The gear step estimation method according to claim 1, wherein the power source includes an electric motor and a stepping force input unit, and the vehicle is an electric power-assisted bicycle capable of generating an assist force by the electric motor based on an input value applied by a user to the stepping force input unit and a travel distance of the vehicle per unit time.

10. A non-transitory computer-readable storage medium storing a gear step estimation program of estimating a gear step of a switching transmission device in a vehicle including a power source, and the switching transmission device provided in a power transmission path between the power source and a wheel, and capable of switching the gear step among n gear steps (n is a natural number of 2 or more), the gear step estimation program causing a processor to execute:

a process of acquiring, at a first time, a first gear ratio that is a gear ratio of a transmission section including the switching transmission device, the transmission section being a whole or a part of the power transmission path;

a process of comparing the acquired first gear ratio with n reference values set within a range of possible gear ratios taken by the n gear steps;

a process of estimating the gear step of the switching transmission device as an m-step (m is a natural number of 1 or more and n or less) in a case where the first gear ratio matches an m-th reference value from a smallest among the n reference values; and a process of controlling the vehicle based on the estimated gear step, or outputting the estimated gear step to a vehicle controller of the vehicle or a display device, and the gear step estimation program causing the processor to further execute:

a process of acquiring, at a second time after the first time, a second gear ratio that is a gear ratio of the transmission section;

a process of comparing the acquired second gear ratio with the n reference values;

a process of estimating the gear step of the switching transmission device as a p-step (p is a natural number of 1 or more and n or less) in a case where the second gear ratio matches a p-th reference value from the smallest among the n reference values; and a process of estimating, based on the m-step estimated at the first time and the p-step estimated at the second time, the gear step of the switching transmission device as the m-step or the p-step.

11. A gear step estimation device that estimates a gear step of a switching transmission device in a vehicle including a power source, and the switching transmission device provided in a power transmission path between the power source and a wheel, and capable of switching the gear step among n gear steps (n is a natural number of 2 or more), the gear step estimation device including:

an acquisition unit configured to acquire, at a first time, a first gear ratio that is a gear ratio of a transmission section including the switching transmission device, the transmission section being a whole or a part of the power transmission path; and an estimation unit configured to compare the first gear ratio acquired by the acquisition unit with n reference values set within a range of possible gear ratios taken by the n gear steps, estimate the gear step of the switching transmission device as an m-step (m is a natural number of 1 or more and n or less) in a case where the first gear ratio matches an m-th reference value from a smallest among the n reference values, and control the vehicle based on the estimated gear step, or output the estimated gear step to a vehicle controller of the vehicle or a display device, wherein the acquisition unit is configured to acquire, at a second time after the first time, a second gear ratio that is a gear ratio of the transmission section, and the estimation unit is configured to compare the acquired second gear ratio with the n reference values, estimate the gear step of the switching transmission device as a p-step (p is a natural number of 1 or more and n or less) in a case where the second gear ratio matches a p-th reference value from the smallest among the n reference values, and estimate, based on the m-step estimated at the first time and the p-step estimated at the second time, the gear step of the switching transmission device as the m-step or the p-step.

12. A gear step estimation method of estimating a gear step of a switching transmission device in a vehicle including a power source, and the switching transmission device provided in a power transmission path between the power source and a wheel, and capable of switching the gear step among n gear steps (n is a natural number of 2 or more), the gear step estimation method including:

acquiring, at a first time, a first gear ratio that is a gear ratio of a transmission section including the switching transmission device, the transmission section being a whole or a part of the power transmission path;

comparing the acquired first gear ratio with n reference values set within a range of possible gear ratios taken by the n gear steps;

estimating the gear step of the switching transmission device as an m-step (m is a natural number of 1 or more and n or less) in a case where the first gear ratio matches an m-th reference value from a smallest among the n reference values; and controlling the vehicle based on the estimated gear step, or outputting the estimated gear step to a vehicle controller of the vehicle or a display device, and the gear step estimation method further including:

estimating, at a fourth time, the gear step of the switching transmission device as a gear step having a largest number of appearances, in a case where the gear step is estimated a plurality of times for a predetermined period before the fourth time.

13. A non-transitory computer-readable storage medium storing a gear step estimation program of estimating a gear step of a switching transmission device in a vehicle including a power source, and the switching transmission device provided in a power transmission path between the power source and a wheel, and capable of switching the gear step among n gear steps (n is a natural number of 2 or more), the gear step estimation program causing a processor to execute:

a process of acquiring, at a first time, a first gear ratio that is a gear ratio of a transmission section including the switching transmission device, the transmission section being a whole or a part of the power transmission path;

a process of comparing the acquired first gear ratio with n reference values set within a range of possible gear ratios taken by the n gear steps;

a process of estimating the gear step of the switching transmission device as an m-step (m is a natural number of 1 or more and n or less) in a case where the first gear ratio matches an m-th reference value from a smallest among the n reference values; and a process of controlling the vehicle based on the estimated gear step, or outputting the estimated gear step to a vehicle controller of the vehicle or a display device, and the gear step estimation program causing the processor to further execute:

a process of estimating, at a fourth time, the gear step of the switching transmission device as a gear step having a largest number of appearances, in a case where the gear step is estimated a plurality of times for a predetermined period before the fourth time.

14. A gear step estimation device that estimates a gear step of a switching transmission device in a vehicle including a power source, and the switching transmission device provided in a power transmission path between the power source and a wheel, and capable of switching the gear step among n gear steps (n is a natural number of 2 or more), the gear step estimation device including:

an acquisition unit configured to acquire, at a first time, a first gear ratio that is a gear ratio of a transmission section including the switching transmission device, the transmission section being a whole or a part of the power transmission path; and an estimation unit configured to compare the first gear ratio acquired by the acquisition unit with n reference values set within a range of possible gear ratios taken by the n gear steps, estimate the gear step of the switching transmission device as an m-step (m is a natural number of 1 or more and n or less) in a case where the first gear ratio matches an m-th reference value from a smallest among the n reference values, and control the vehicle based on the estimated gear step, or output the estimated gear step to a vehicle controller of the vehicle or a display device, wherein the estimation unit is configured to estimate, at a fourth time, the gear step of the switching transmission device as a gear step having a largest number of appearances, in a case where the gear step is estimated a plurality of times for a predetermined period before the fourth time.

15. A gear step estimation method of estimating a gear step of a switching transmission device in a vehicle including a power source, and the switching transmission device provided in a power transmission path between the power source and a wheel, and capable of switching the gear step among n gear steps (n is a natural number of 2 or more), the gear step estimation method including:

acquiring, at a first time, a first gear ratio that is a gear ratio of a transmission section including the switching transmission device, the transmission section being a whole or a part of the power transmission path;

comparing the acquired first gear ratio with n reference values set within a range of possible gear ratios taken by the n gear steps;

estimating the gear step of the switching transmission device as an m-step (m is a natural number of 1 or more and n or less) in a case where the first gear ratio matches an m-th reference value from a smallest among the n reference values; and controlling the vehicle based on the estimated gear step, or outputting the estimated gear step to a vehicle controller of the vehicle or a display device, and the gear step estimation method further including:

when comparing the first gear ratio with the n reference values, executing at least one of (i) to (iii), in a case where the first gear ratio is smaller than a reference value of a minimum gear step among the n reference values or larger than a reference value of a maximum gear step among the n reference values, wherein (i) determining an abnormal occurrence in the power transmission path, (ii) generating information for limiting or prohibiting a drive using the power transmission path, and (iii) generating information for reporting to at least one of an occupant of the vehicle, a party which manufactures the vehicle, a party which manages the vehicle, a party which certifies the vehicle, and a regulatory party of the vehicle.

16. A non-transitory computer-readable storage medium storing a gear step estimation program of estimating a gear step of a switching transmission device in a vehicle including a power source, and the switching transmission device provided in a power transmission path between the power source and a wheel, and capable of switching the gear step among n gear steps (n is a natural number of 2 or more), the gear step estimation program causing a processor to execute:

a process of acquiring, at a first time, a first gear ratio that is a gear ratio of a transmission section including the switching transmission device, the transmission section being a whole or a part of the power transmission path;

a process of comparing the acquired first gear ratio with n reference values set within a range of possible gear ratios taken by the n gear steps;

a process of estimating the gear step of the switching transmission device as an m-step (m is a natural number of 1 or more and n or less) in a case where the first gear ratio matches an m-th reference value from a smallest among the n reference values; and a process of controlling the vehicle based on the estimated gear step, or outputting the estimated gear step to a vehicle controller of the vehicle or a display device, and the gear step estimation program causing the processor to further execute:

when comparing the first gear ratio with the n reference values, a process of executing at least one of (i) to (iii), in a case where the first gear ratio is smaller than a reference value of a minimum gear step among the n reference values or larger than a reference value of a maximum gear step among the n reference values, wherein (i) determining an abnormal occurrence in the power transmission path, (ii) generating information for limiting or prohibiting a drive using the power transmission path, and (iii) generating information for reporting to at least one of an occupant of the vehicle, a party which manufactures the vehicle, a party which manages the vehicle, a party which certifies the vehicle, and a regulatory party of the vehicle.

17. A gear step estimation device that estimates a gear step of a switching transmission device in a vehicle including a power source, and the switching transmission device provided in a power transmission path between the power source and a wheel, and capable of switching the gear step among n gear steps (n is a natural number of 2 or more), the gear step estimation device including:

an acquisition unit configured to acquire, at a first time, a first gear ratio that is a gear ratio of a transmission section including the switching transmission device, the transmission section being a whole or a part of the power transmission path; and an estimation unit configured to compare the first gear ratio acquired by the acquisition unit with n reference values set within a range of possible gear ratios taken by the n gear steps, estimate the gear step of the switching transmission device as an m-step (m is a natural number of 1 or more and n or less) in a case where the first gear ratio matches an m-th reference value from a smallest among the n reference values, and control the vehicle based on the estimated gear step, or output the estimated gear step to a vehicle controller of the vehicle or a display device, wherein the gear step estimation device is configured to, when comparing the first gear ratio with the n reference values, execute at least one of (i) to (iii), in a case where the first gear ratio is smaller than a reference value of a minimum gear step among the n reference values or larger than a reference value of a maximum gear step among the n reference values, wherein (i) determining an abnormal occurrence in the power transmission path, (ii) generating information for limiting or prohibiting a drive using the power transmission path, and (iii) generating information for reporting to at least one of an occupant of the vehicle, a party which manufactures the vehicle, a party which manages the vehicle, a party which certifies the vehicle, and a regulatory party of the vehicle.

18. A gear step estimation method of estimating a gear step of a switching transmission device in a vehicle including a power source, and the switching transmission device provided in a power transmission path between the power source and a wheel, and capable of switching the gear step among n gear steps (n is a natural number of 2 or more), the gear step estimation method including:

acquiring, at a first time, a first gear ratio that is a gear ratio of a transmission section including the switching transmission device, the transmission section being a whole or a part of the power transmission path;

comparing the acquired first gear ratio with n reference values set within a range of possible gear ratios taken by the n gear steps;

estimating the gear step of the switching transmission device as an m-step (m is a natural number of 1 or more and n or less) in a case where the first gear ratio matches an m-th reference value from a smallest among the n reference values; and controlling the vehicle based on the estimated gear step, or outputting the estimated gear step to a vehicle controller of the vehicle or a display device, and the gear step estimation method further including at least one of:

(A) when comparing the first gear ratio with the n reference values, estimating the gear step of the switching transmission device as an [n+1]-th step, in a case where the first gear ratio is larger than a reference value of a maximum gear step among the n reference values;

(B) when comparing the first gear ratio with the n reference values, estimating the gear step of the switching transmission device as a 0-step, in a case where the gear ratio of the transmission section cannot be acquired or in a case where the gear step cannot be estimated; and (C) estimating the gear step of the switching transmission device as an initial value, when a travel distance of the vehicle per unit time becomes a predetermined threshold or less at a fifth time after the first time.

19. A non-transitory computer-readable storage medium storing a gear step estimation program of estimating a gear step of a switching transmission device in a vehicle including a power source, and the switching transmission device provided in a power transmission path between the power source and a wheel, and capable of switching the gear step among n gear steps (n is a natural number of 2 or more), the gear step estimation program causing a processor to execute:

a process of acquiring, at a first time, a first gear ratio that is a gear ratio of a transmission section including the switching transmission device, the transmission section being a whole or a part of the power transmission path;

a process of comparing the acquired first gear ratio with n reference values set within a range of possible gear ratios taken by the n gear steps;

a process of estimating the gear step of the switching transmission device as an m-step (m is a natural number of 1 or more and n or less) in a case where the first gear ratio matches an m-th reference value from a smallest among the n reference values; and a process of controlling the vehicle based on the estimated gear step, or outputting the estimated gear step to a vehicle controller of the vehicle or a display device, and the gear step estimation program causing the processor to further execute at least one of:

(A) when comparing the first gear ratio with the n reference values, estimating the gear step of the switching transmission device as an [n+1]-th step, in a case where the first gear ratio is larger than a reference value of a maximum gear step among the n reference values;

(B) when comparing the first gear ratio with the n reference values, estimating the gear step of the switching transmission device as a 0-step, in a case where the gear ratio of the transmission section cannot be acquired or in a case where the gear step cannot be estimated; and (C) estimating the gear step of the switching transmission device as an initial value, when a travel distance of the vehicle per unit time becomes a predetermined threshold or less at a fifth time after the first time.

20. A gear step estimation device that estimates a gear step of a switching transmission device in a vehicle including a power source, and the switching transmission device provided in a power transmission path between the power source and a wheel, and capable of switching the gear step among n gear steps (n is a natural number of 2 or more), the gear step estimation device including:

an acquisition unit configured to acquire, at a first time, a first gear ratio that is a gear ratio of a transmission section including the switching transmission device, the transmission section being a whole or a part of the power transmission path; and an estimation unit configured to compare the first gear ratio acquired by the acquisition unit with n reference values set within a range of possible gear ratios taken by the n gear steps, estimate the gear step of the switching transmission device as an m-step (m is a natural number of 1 or more and n or less) in a case where the first gear ratio matches an m-th reference value from a smallest among the n reference values, and control the vehicle based on the estimated gear step, or output the estimated gear step to a vehicle controller of the vehicle or a display device, wherein the estimation unit is configured to perform at least one of:

(A) when comparing the first gear ratio with the n reference values, estimating the gear step of the switching transmission device as an [n+1]-th step, in a case where the first gear ratio is larger than a reference value of a maximum gear step among the n reference values;

(B) when comparing the first gear ratio with the n reference values, estimating the gear step of the switching transmission device as a 0-step, in a case where the gear ratio of the transmission section cannot be acquired or in a case where the gear step cannot be estimated; and (C) estimating the gear step of the switching transmission device as an initial value, when a travel distance of the vehicle per unit time becomes a predetermined threshold or less at a fifth time after the first time.

* * * * *